United States Patent
Tafazoli Bilandi et al.

(10) Patent No.: US 11,985,122 B2
(45) Date of Patent: May 14, 2024

(54) METHOD AND APPARATUS FOR SHARING CONTENT DATA BETWEEN NETWORKED DEVICES

(71) Applicant: LINKME TECHNOLOGIES INC., North Vancouver (CA)

(72) Inventors: Farshid Tafazoli Bilandi, North Vancouver (CA); Amin Suzani, New Westminster (CA); Shahram Tafazoli Bilandi, Vancouver (CA)

(73) Assignee: LinkMe Technologies Inc., North Vancouver (CA)

( * ) Notice: Subject to any disclaimer, the term of this patent is extended or adjusted under 35 U.S.C. 154(b) by 311 days.

(21) Appl. No.: 17/626,732

(22) PCT Filed: Jul. 14, 2020

(86) PCT No.: PCT/CA2020/050980
§ 371 (c)(1),
(2) Date: Jan. 12, 2022

(87) PCT Pub. No.: WO2021/007668
PCT Pub. Date: Jan. 21, 2021

(65) Prior Publication Data
US 2022/0247736 A1    Aug. 4, 2022

Related U.S. Application Data

(60) Provisional application No. 62/874,799, filed on Jul. 16, 2019.

(51) Int. Cl.
G06F 21/00    (2013.01)
G06F 21/62    (2013.01)
H04L 9/40    (2022.01)

(52) U.S. Cl.
CPC ...... *H04L 63/0846* (2013.01); *G06F 21/6218* (2013.01); *H04L 63/108* (2013.01)

(58) Field of Classification Search
None
See application file for complete search history.

(56) References Cited

U.S. PATENT DOCUMENTS 7,502,754 B2 * 3/2009 Campbell .............. G06Q 40/00
709/227
8,566,115 B2 * 10/2013 Moore ................ G06F 21/6254
705/2

(Continued)

OTHER PUBLICATIONS

International Search Report and Written Opinion issued by the Canadian Intellectual Property Office in connection with International Patent Application No. PCT/CA2020/050980 dated Sep. 23, 2020, 15 pages.

*Primary Examiner* — Maung T Lwin
(74) *Attorney, Agent, or Firm* — Y. Artemis Lai

(57) ABSTRACT

A system and method for sharing content data between networked devices in communication with a server processor circuit via a data network is disclosed. The method involves, in response to a request received at the server from a first networked device to upload content data, causing the content data to be written to a storage location at a content storage address. The method also involves causing the server processor circuit to store the content storage address in a database managed by the server. The method further involves causing the server processor circuit to associate an access key with the content storage address in the database and to determine and store an expiry for the access key in the database, the expiry facilitating a determination as to whether the access key remains actively associated with the content data or has expired and is no longer associated with the content data. The method also involves receiving a (Continued)

content access request at the server from a second networked device to access the content data uploaded by the first networked device, the content access request including a request access key. The method further involves causing the server processor circuit to perform a database query and if there is an unexpired access key in the database that matches the request access key, authorizing the second networked device to access the content data.

29 Claims, 18 Drawing Sheets

(56) References Cited

U.S. PATENT DOCUMENTS

| | | | | |
|---|---|---|---|---|
| 8,639,625 | B1* | 1/2014 | Ginter | G06F 21/78 |
| | | | | 705/50 |
| 9,419,965 | B2* | 8/2016 | Tan | H04L 63/083 |
| 10,305,902 | B2* | 5/2019 | Kim | G06F 21/44 |
| 2001/0042043 | A1 | 11/2001 | Shear et al. | |
| 2003/0110131 | A1 | 6/2003 | Alain et al. | |
| 2009/0144183 | A1* | 6/2009 | Gatchell | G06Q 30/04 |
| | | | | 705/34 |
| 2014/0137218 | A1* | 5/2014 | Matson | G06F 21/335 |
| | | | | 726/6 |

* cited by examiner

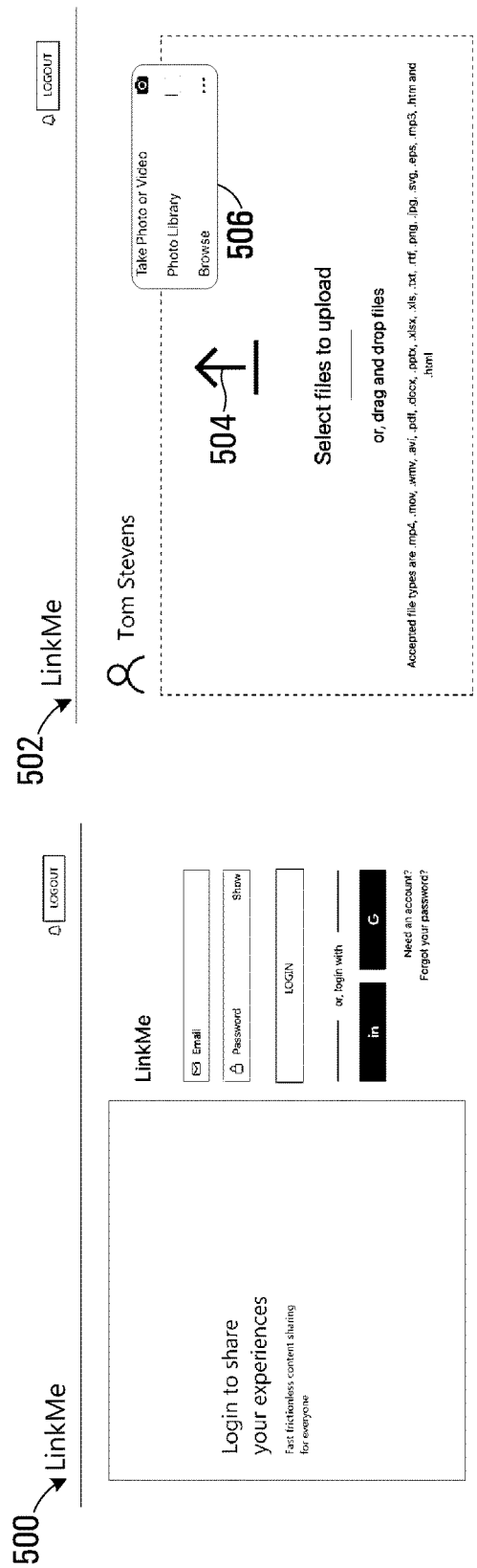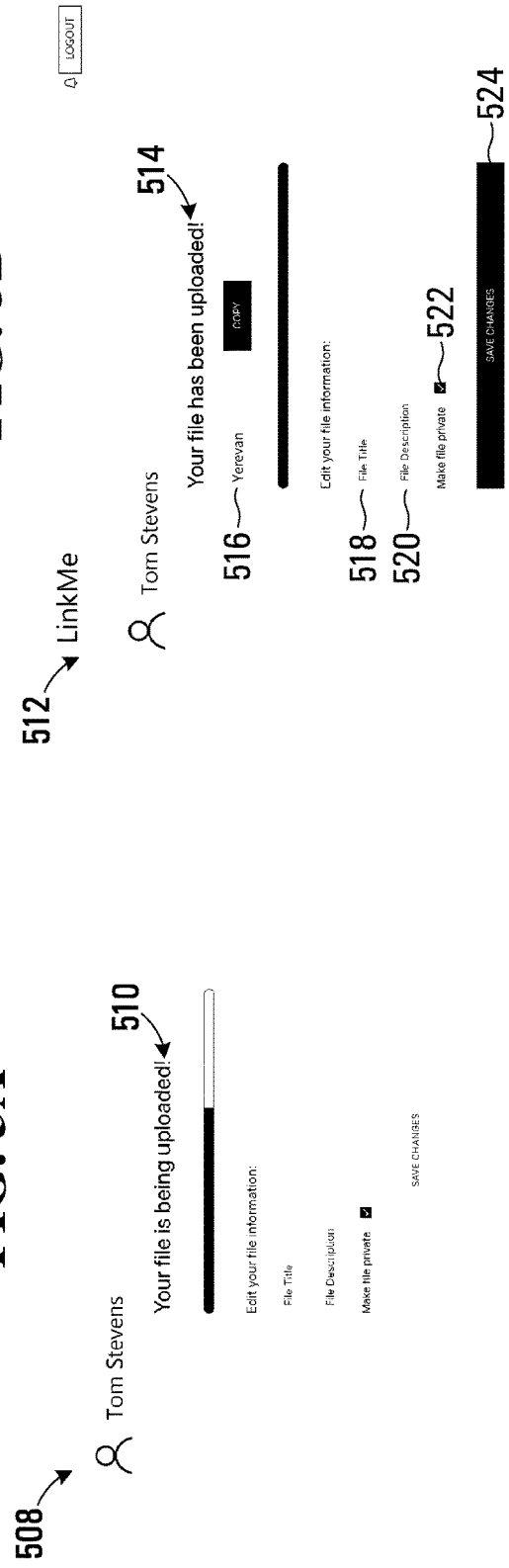
FIG. 5A
FIG. 5B
FIG. 5C
FIG. 5D

600

"Content metadata table": [
```
{
    "content_id" : "HyKiJyOcm",  —612
    "address" : "https://s3.amazonaws.com/Linkme.Image.jpg",  —614
    "owner" : "Tom Stevens",  —616
    "size" : "2.031",  —618
    "type" : "JPEG",  —620
    "public_private" : "private",  —622
    "file_title" : "My_Office",—624
    "file_description" : "View from my office"  —626
},
```
602

```
{
    "content_id" : "HJObe1Oqm",
    "address" : "https://s3.amazonaws.com/Linkme.Map.jpg",
    "owner" : "Tom Stevens",
    "size" : "1.848",
    "type" : "JPEG",
    "public_private" : "private",
    "file_title" : "Map",
    "file_description" : ""
},
```
604

```
{
    "content_id" : "ryV0tk6mE",
    "address" : "https://s3.amazonaws.com/Linkme.Form.pdf",
    "owner" : "Tom Stevens",
    "size" : "1.744",
    "type" : "PDF",
    "public_private" : "public",
    "file_title" : "Form",
    "file_description" : ""
},
```
606

```
{
    "content_id" : "jkH6Yurt5",
    "address" : "https://s3.amazonaws.com/Linkme.Ford 150.pdf",
    "owner" : "John Smith",
    "size" : "1.934",
    "type" : "PDF",
    "public_private" : "public",
    "file_title" : "Ford 150",
    "file_description" : "Advertisement for Ford 150"
},
```
608

```
{
    "content_id" : "Kb7gh42Tg",
    "address" : "https://s3.amazonaws.com/Linkme.Paris_trip.jpg",
    "owner" : "John Smith",
    "size" : "2.951",
    "type" : "JPEG",
    "public_private" : "private",
    "file_title" : "",
    "file_description" : ""
},]
```
610

FIG. 6A

630 → "access_key_table" : [
　{
632 {　　"access_key" : "Yerevan" —642
　　　　"content_id" : "HyKiJyOcm", —644
　　　　"expiry" : "30/04/2019 11:21" —646
　},
　{
634 {　　"access_key" : "Karukh"
　　　　"content_id" : "HJObe1Oqm",
　　　　"expiry" : "30/04/2019 15:36"
　},
　{
636 {　　"access_key" : "Burrel"
　　　　"content_id" : "ryV0tk6mE",
　　　　"expiry" : "01/05/2019  9:25"
　},
　{
638 {　　"access_key" : "830HSW"
　　　　"content_id" : "jkH6Yurt5",
　　　　"expiry" : "01/05/2019 19:35"
　},
　{
640 {　　"access_key" : "Tennis"
　　　　"content_id" : "Kb7gh42Tg",
　　　　"expiry" : "02/05/2019 10:05"
　},]

FIG. 6B

650 → "User_table_tom_stevens":[
　{
652 {　　"content_id" : "HyKiJyOcm", —654
　　　　"status" : "owner" —656
　},
　{
　　　　"content_id" : "HJObe1Oqm",
　　　　"status" : "owner"
　},
　{
658 {　　"content_id" : "ryV0tk6mE", —660
　　　　"status" : "owner" —662
　},]

"User_table_john_smith":[

662 { { "content_id" : "jkH6Yurt5", —668
"status" : "shared" —670
},

664 { { "content_id" : "Kb7gh42Tg",
"status" : "owner"
},

666 { { "content_id" : "HyKiJyOcm", —672
"status" : "shared" —674
},]

"notifications_table" : [

682 { { "notification_id" : "hj7Ytksf6", —684
"content_id" : "HyKiJyOcm", —686
"owner" : "Tom Stevens", —688
"requestor" : "John Smith" —690
},]

FIG. 6E

METHOD AND APPARATUS FOR SHARING CONTENT DATA BETWEEN NETWORKED DEVICES

BACKGROUND

1. Field

This disclosure relates generally to methods for sharing content data between networked devices in communication with a server processor circuit via a data network.

2. Description of Related Art

Sharing of digital content via networked devices such as smartphones, data tablets, laptop and desktop computers and other networked devices has become prevalent. Users share data content for social or commercial purposes. The uploaded content may be stored in a storage location accessible via a data network having a network address. However, in many instances accessing uploaded content may be hampered by practicalities since the storage address may be long and difficult to enter without making a mistake. There remains a need for providing easy access to content that has been uploaded.

SUMMARY

In accordance with one disclosed aspect there is provided a server implemented method for sharing content data between networked devices in communication with a server processor circuit via a data network. The method involves, in response to a request received at the server from a first networked device to upload content data, causing the content data to be written to a storage location at a content storage address. The method also involves causing the server processor circuit to store the content storage address in a database managed by the server. The method further involves causing the server processor circuit to associate an access key with the content storage address in the database and to determine and store an expiry for the access key in the database, the expiry facilitating a determination as to whether the access key remains actively associated with the content data or has expired and is no longer associated with the content data. The method also involves receiving a content access request at the server from a second networked device to access the content data uploaded by the first networked device, the content access request including a request access key. The method further involves causing the server processor circuit to perform a database query and if there is an unexpired access key in the database that matches the request access key, authorizing the second networked device to access the content data.

Causing the server processor circuit to determine the expiry for the access key may involve setting an expiry for the access key at about 90 days from a date of association of the access key.

The method of may further involve, in response to receiving a request from a user of the first networked device, causing the server processor circuit to extend the expiry of the access key by an additional time period.

The access key may include an alphanumeric keyword, the keyword having a length of less than 20 characters.

The request to upload content data may include a user identification of a user of the first networked device, and may further involve performing a user authentication prior to uploading the content data to the storage location.

The method may involve storing and associating the user identification of the user of first networked device with the content storage address of the content data in the database.

Causing the content data to be written to the storage location may involve receiving the content data from the first network device at the server, and causing the content data to be written to the storage location may involve writing the content data to a network storage location accessible via the data network and having a network storage address.

The method may involve processing the received content data prior to writing to the network storage location, and the processing may involve at least one of determining a data size associated with the content, establishing compliance with criteria for storage of the content data in the network storage location, performing a virus scan on the content data, performing a malware scan on the content data, or encrypting the content data.

The database may include a plurality of stored keywords, each keyword being a unique and meaningful alphanumeric word or phrase and associating the access key with the content data may involve selecting a keyword in the database that either has not yet been associated with content data or has expired and is no longer associated with the content data.

Associating the access key with the content data may involve receiving access key data from the first networked device and storing the access key data in the database.

The method may involve causing the server processor circuit to extend the expiry beyond an access key lifetime for an access key based on access key data received from a networked device.

Determining expiry for the access key may involve one of calculating an expiry time based on an access key lifetime and storing the expiry time in the database, storing in the database, a time of day when the access key was associated with the content data in the database, and calculating an expiry time based on a pre-determined access key lifetime, calculating an expiry time based on an access key lifetime, the access key lifetime selected from a plurality of pre-determined access key lifetimes associated with different levels of user membership, and storing the expiry time in the database, or calculating an expiry time based on a number of characters in an access keyword may involve a plurality of alphanumeric characters.

Associating the access key with the content data may involve associating an image with the content data, the image may involve one of image data extracted by the server from the content data, image data uploaded by the first networked device for associating with the content data, a barcode, QR code, or other encoded pattern assigned by the server, or a barcode, QR code or other encoded pattern uploaded by the first networked device for associating with the content data.

The method may involve causing the server processor circuit to generate a content identifier and to store and associate the content identifier in the database with at least one of the content storage address and the associated access key.

Causing the server processor circuit to store the content storage address may involve storing a content record to a content table in the database, the content record including the content storage address and the content identifier and associating the access key with the content storage address may involve storing the content identifier in an access key record in an access key table in the database, the access key record further including the access key and the expiry associated with the access key.

The method may involve causing the server processor circuit to generate and associate a status with the content data, the status being indicative that the content data is owned by a user of the first networked device.

The method may involve, in response to a request from the first networked device, querying the database to extract information associated with all content data uploaded by the user of the first networked device and transmitting the information for display on the first networked device.

The method may involve in response to a requested change to the information associated with the content data received from the user of the first networked device, causing the server processor circuit to make the requested change to the information associated with the content data in the database.

The method may involve receiving from the first networked device, a privacy indicator indicating that the content data should be only accessible on a private basis by users that have been granted permission by a user of the first networked device, and storing and associating the privacy indicator with the content storage address for the content data.

The method may involve generating additional metadata for the content data and storing and associating the metadata with the content storage address for the content data, the additional metadata including at least one of a user name associated with a user of the first device, a data size of the networked content, a content data title associated with the content data, or a content data description associated with the content data.

The access request may further include an identification of a user of the second networked device, and the method may further involve performing a user authentication prior to causing the server processor circuit to perform the database query to determine if there is an unexpired access key in the database that matches the request access key.

The request access key in the access request may involve one of a unique and meaningful alphanumeric keyword or phrase entered by the user of the second networked device, alphanumeric text extracted from an image having the keyword digitally encoded therein, the image being captured and processed by the second networked device to extract the alphanumeric text, alphanumeric text extracted by performing speech recognition on audio data, the audio data being captured and processed by the second networked device to extract the alphanumeric text.

Receiving the access request may involve receiving an access key including an image related to the content data, and the method may further involve causing the server to process the image to extract an identifying feature and causing the server processor circuit to query the database may involve causing the server to determine whether an access key stored in the database has a matching identifying feature.

The identifying feature may involve one of a keyword extracted from the image by causing the server processor circuit to perform optical character recognition on the image, or a pattern extracted from the image by causing the server processor circuit to perform a rendering process on the image.

Authorizing the second networked device to access the content data may involve causing the server processor circuit to query the database to determine whether the content data has a privacy indicator indicating that the content data should be only accessible on a private basis by users that have been granted permission by a user of the first networked device, and if the privacy indicator indicates that the content data is not only accessible on a private basis, causing the server processor circuit to store a status indicator in the database indicating that the content data is shared with the user of the second networked device.

Authorizing the second networked device to access the content data may involve causing the server processor circuit to query the database to determine whether the content data has privacy indicator indicating that the content data should be only accessible on a private basis by users that have been granted permission by a user of the first networked device, if the privacy indicator indicates that the content data is only accessible on a private basis, causing the server to generate a notification for transmission to the user of the first networked device indicating that a user of the second networked device has requested access to the content data, and in response to receiving sharing permission from the user of the first networked device to share the content data, causing the server processor circuit to store and associate a status indicator in the database with the content storage address of the content data, the status indicator being indicative that the content data is shared with the user of the second networked device.

The method may involve in response to a request from the second networked device, querying the database to extract information associated with all content data shared with the user of the second networked device and transmitting the information for display on the second networked device and the method may further involve in response to receiving a selection from the second networked device of an item of content data shared with the user, causing the processor to download the content data from the storage location and to transmit the content data to the second networked device.

The content data may include a presentation file and the access key may include one of an image of a portion of the presentation file displayed during a live presentation, a keyword displayed during a live presentation, or a keyword included in materials related to the presentation.

The content data may include information associated with an item that is available for purchase and the access key may include one of a vehicle identification number for a vehicle, a captured image of a plate bearing the vehicle identification number, alphanumeric characters of a vehicle registration plate on a vehicle, a captured image of the vehicle registration plate, or a listing number of a property for sale.

In accordance with another disclosed aspect there is provided a server apparatus for sharing content data between networked devices in communication with the server via a data network. The apparatus includes a server processor circuit, a storage location accessible by the server processor circuit, and a database managed by the server. The server processor circuit is operably configured to, in response to a request received at the server from a first networked device to upload content data, cause the content data to be written to the storage location at a content storage address, store the content storage address in the database, and associate an access key with the content storage address in the database. The server processor circuit is also operably configured to determine and store an expiry for the access key in the database, the expiry facilitating a determination as to whether the access key remains actively associated with the content data or has expired and is no longer associated with the content data. The server processor circuit is further operably receive an access request at the server from a second networked device to access the content data uploaded by the first networked device, the access request including a request access key, and perform a database query and if there is an unexpired access key in the database that matches the request access key, authorize the second networked device to access the content data.

Other aspects and features will become apparent to those ordinarily skilled in the art upon review of the following description of specific disclosed embodiments in conjunction with the accompanying figures.

BRIEF DESCRIPTION OF THE DRAWINGS

In drawings which illustrate disclosed embodiments,

FIG. 5A-5D are a series of screenshots depicting screens displayed on a display of the networked device processor circuit shown in FIG. 3;

FIG. 6A is an example of a metadata table stored within a networked database shown in FIG. 1;

FIG. 6B is an example of an access key table stored within a networked database shown in FIG. 1;

FIG. 6C is a first example of a user table stored within a networked database shown in FIG. 1;

FIG. 6D is a second example of a user table stored within a networked database shown in FIG. 1;

FIG. 6E is an example of a notifications table stored within a networked database shown in FIG. 1;

DETAILED DESCRIPTION

Figure 1:
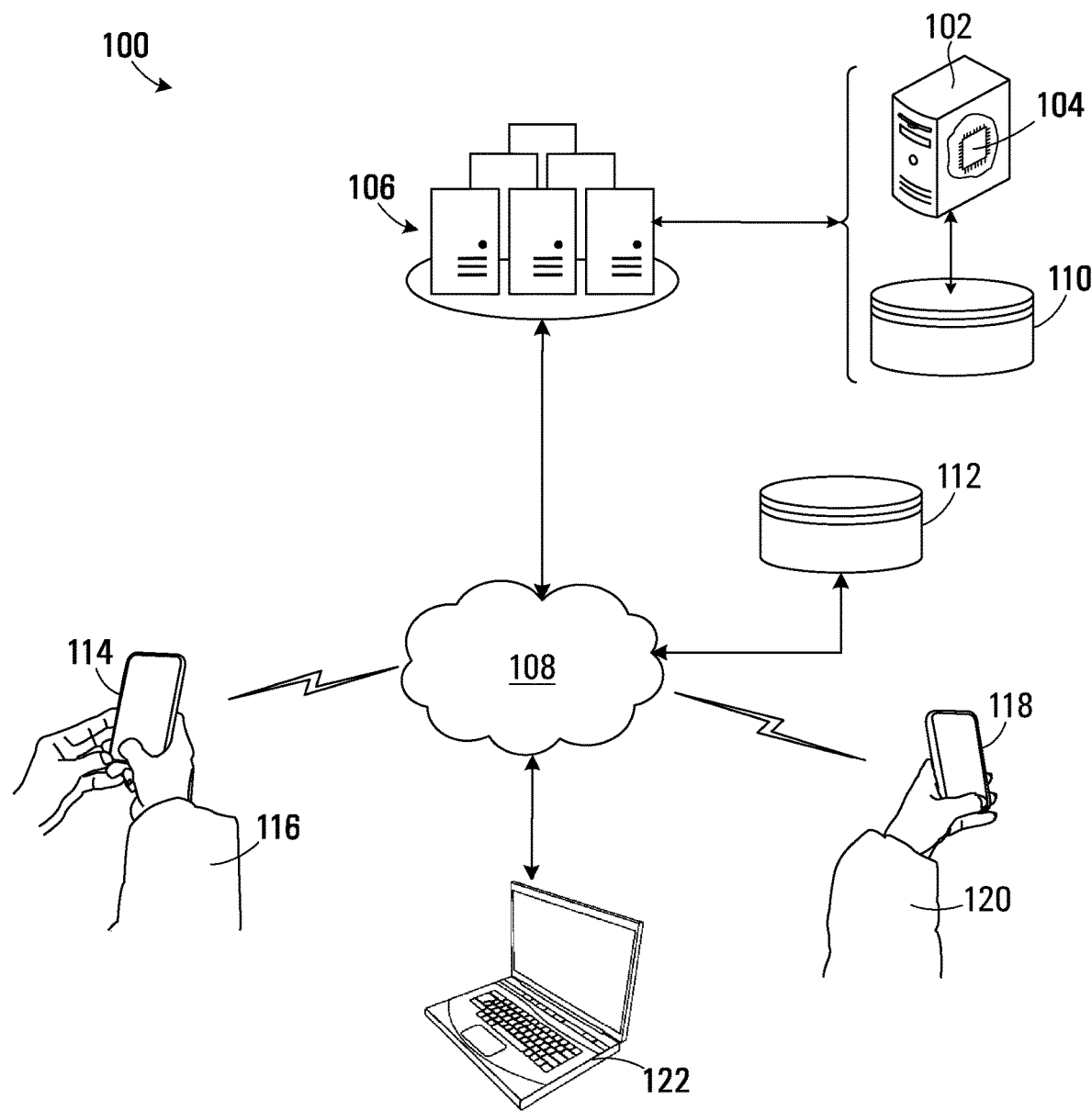
FIG. 1 is a block diagram of a system for sharing content data in accordance with a first disclosed embodiment.

Referring to FIG. 1, a system for sharing content data is shown generally at 100. The system 100 includes a server 102 having a server processor circuit 104. In one embodiment the server 102 may be one of a plurality of servers or a virtual server made available in a server farm 106, such as the on-demand cloud computing platforms provided by Amazon Web Services (AWS). The server 102 or server farm 106 is in data communication with a data network 108 such as the Internet. The server 102 is also in communication with a storage location 110, which may be a cloud storage service such as Amazon Simple Storage Service (Amazon S3) offered by Amazon Web Services that provides object storage through a web service interface at a storage address accessible via the data network 108. In other embodiments the storage location 110 may be implemented using local storage associated with the server 102.

In this embodiment the system 100 also includes a networked database 112 which is accessible via the data network 108. In one embodiment the networked database 112 may be implemented as a MongoDB, which is a document-oriented database program. In other embodiments the networked database 112 may be hosted on one or more of the servers in the server farm 106.

A plurality of other networked devices are also in data communication with the data network 108. In the embodiment shown a first networked device 114 in use by a first user 116 is wirelessly connected to the data network 108. The wireless connection may be an IEEE 804.11 Wi-Fi connection, Bluetooth connection, or a cellular data connection, for example. In the embodiment shown the first networked device 114 is a smartphone device. A second networked device 118, also a smartphone, is in use by a second user 120 and is wirelessly connected to the data network 108. In the embodiment shown a third networked device in the form of a laptop computer 122 is connected to the data network 108 via a wired connection. The first networked device 114, the second networked device 118, and the laptop computer 122 are thus each able to transmit or upload data to the server 102 via the data network 108 and receive or download data via the data network.

Figure 2:
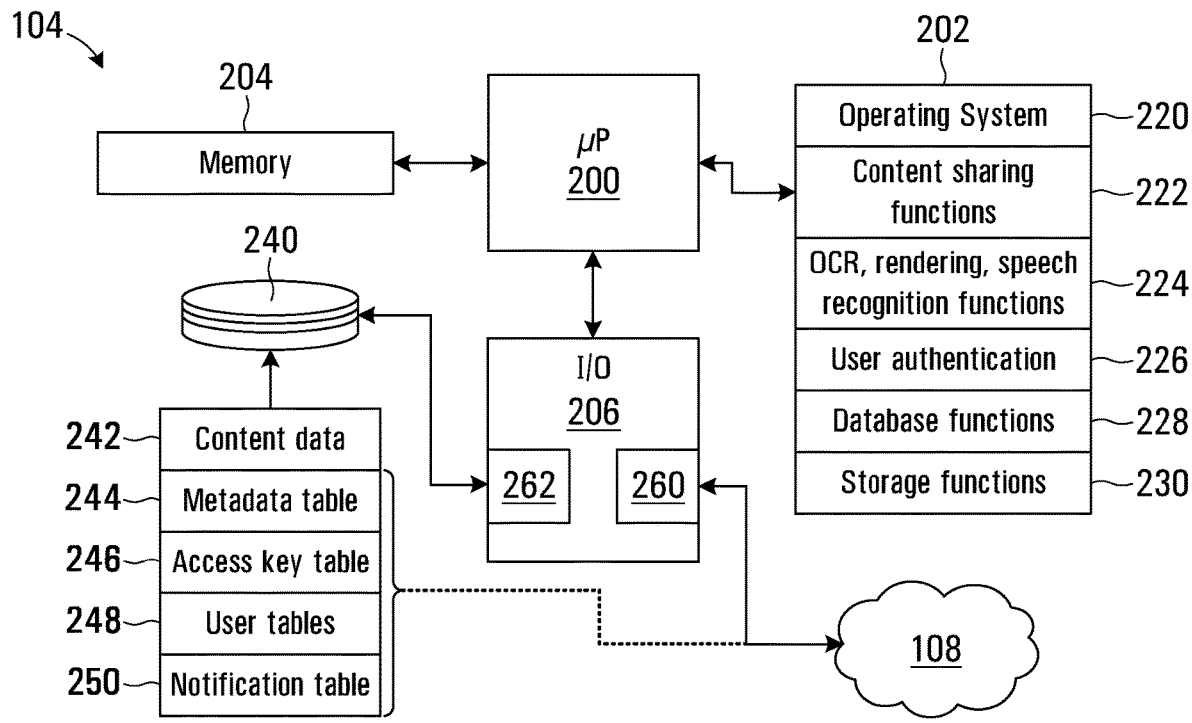
FIG. 2 is a block diagram of a server processor circuit for implementing a server shown in FIG. 1.

A block diagram of the server processor circuit 104 is shown in FIG. 2. Referring to FIG. 2 the processor circuit 104 includes a microprocessor 200, a program memory 202, a variable memory 204, and an input output port (I/O) 206, all of which are in communication with the microprocessor 200. Program codes for directing the microprocessor 200 to carry out various functions are stored in the program memory 202, which may be implemented as a random access memory (RAM), and/or a solid state or hard disk drive, or a combination thereof. The code may be written in any suitable program language, such as Javascript, Python, Java, C, C++, C#, and/or assembly code, for example. The program memory 202 includes a block of program codes 220 for directing the microprocessor 200 to perform operating system functions. The program memory 202 also includes a block of codes 222 for directing the microprocessor 200 to provide content sharing functions, a block of codes 224 for directing the microprocessor to perform optical character recognition, image rendering, or speech recognition functions, and a block of codes 226 for providing use authentication services. The program memory 202 also includes a block of codes 228 for directing the microprocessor 200 to provide database functions, and a block of codes 230 for directing the microprocessor 200 to provide content storage and retrieval functions.

In the embodiment shown in FIG. 2, the processor circuit 104 further includes a mass storage unit 240 providing data storage for storing content data and other data associated with providing content sharing functions. In one embodiment the mass storage unit 240 may be implemented using one or more hard drive units, solid state drives, or other persistent storage medium such as a magnetic tape storage unit. The mass storage unit 240 may provide storage for a number of different types of data items such as short term storage for content data 242 while being uploaded. The mass storage unit 240 may in some embodiments provide storage for database tables including a metadata table 244, an access key table 246, user tables 248, and a notifications table 250. In other embodiments the database tables 244-250 may be stored in the networked database 112 as shown in FIG. 1.

The I/O 206 includes a communications interface 260 for conducting data communications over the data network 108. The I/O 206 also includes a storage interface 262 for interfacing with the mass storage unit 240.

Although the processor circuit 104 is shown in FIG. 2 as having conventional computer architecture, the processor may be implemented using shared configurable computer system resources such as may be provided by companies such as Microsoft, Google, or Amazon and other cloud computing resource providers. As such, the processor circuit 104 shown may represent a virtual machine, possibly implemented using multiple processors and other resources to provide the necessary functionality. One advantage of using a shared computing resource is that the resource becomes dynamically scalable and additional processing power or storage may be allocated as required. As such, the microprocessor 200, program memory 202, variable memory 204, and I/O 206, may be parts of a virtual machine hosted on a shared and/or distributed computing resource.

A block diagram of a processor circuit for implementing any of the devices 114, 118, or 122 is shown generally at 300 in FIG. 2. Referring to FIG. 2, the processor circuit 300 includes a microprocessor 302, a display 304, and an input device 306 for receiving user input. In some embodiments the input device 306 may be provided as touch screen on the display 304. The processor circuit 300 also includes a memory 310 for storing data associated with operating system functions and/or applications that are running on the device. The memory 310 may be implemented using random access memory, non-volatile flash memory, a hard drive or combination of these and other memory types. The memory 310 may be used for storing program codes and/or data and in the embodiment shown includes an operating system storage location 312, a content sharing application storage location 314 for storing program codes for implementing content sharing application on the device, and a data storage location 316 for storing content data.

The processor circuit 300 further includes a RF baseband radio 320 and antenna 322 for connecting to a mobile telecommunications network. The RF baseband radio 320 may be configured to provide data communications using any of a variety of communications standards including 2G, 3G, 4G, and/or 5G or any other communications standards. The processor circuit 300 also includes a wireless radio 324 and antenna 326 for connecting to local networks such as an IEEE 804.11 Wi-Fi local network. The wireless radio 324 may also provide for connections via other wireless links or protocols, such as Bluetooth, Wi-Fi Direct, or near-field communication. The processor circuit 300 further optionally includes a location receiver 328. The location receiver 328 includes an antenna 330 for receiving global positioning system (GPS) signals and the location receiver may use the GPS information in combination with other location information such as a known location of a particular local network access point or cellular signal triangulation information provided by a cellular service provider to determine a location of the networked device. The processor circuit 300 further includes an audio processor 332, a microphone 334, and a speaker 336. The audio processor 332 receives and processes audio input signals from the microphone 334 and produces audio outputs at the speaker 336. The processor circuit 300 also includes a video/image processor 338 and a camera 340. The video/image processor 338 receives and processes image and/or video signals from the camera 340. The display 304, input device 306, memory 310, RF baseband radio 320, wireless radio 324, location receiver 328, audio processor 332, and video/image processor 338 are all in communication with the microprocessor 302.

The operating system storage location 220 stores codes for directing the microprocessor 302 to implement an operating system, which for the smartphone devices 114 and 118 may be an Android™ based operating system, an iOS based operating system, or any other operating system. The laptop computer 122 may be running an Android, iOS, Windows®, Linux, or any other suitable operating system.

Figure 3:
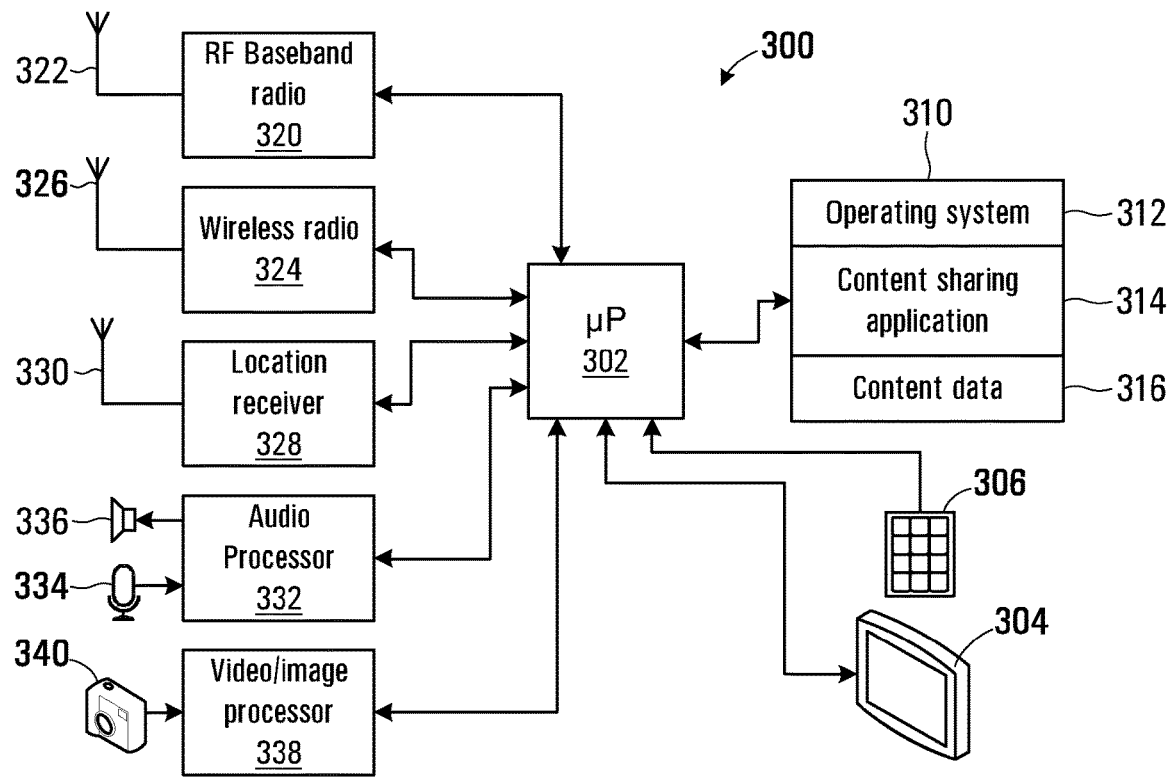
FIG. 3 is a block diagram of a networked device processor circuit for implementing an of a plurality of networked devices shown in FIG. 1.

Each of the devices 114, 118, and 122 may be implemented using the processor circuit 300 or similar processor circuit. The laptop computer device 122 may include many of the components of the processor circuit 300 shown in FIG. 3, although some components may be omitted such as the location receiver 328 and RF baseband radio 320. While embodiments are described herein with reference to the processor circuit architecture 300 shown in FIG. 3, the described system embodiments and/or process embodiments are also applicable to communications between other types of devices capable of connecting to the data network 108.

Uploading Content Data

Figure 4A:
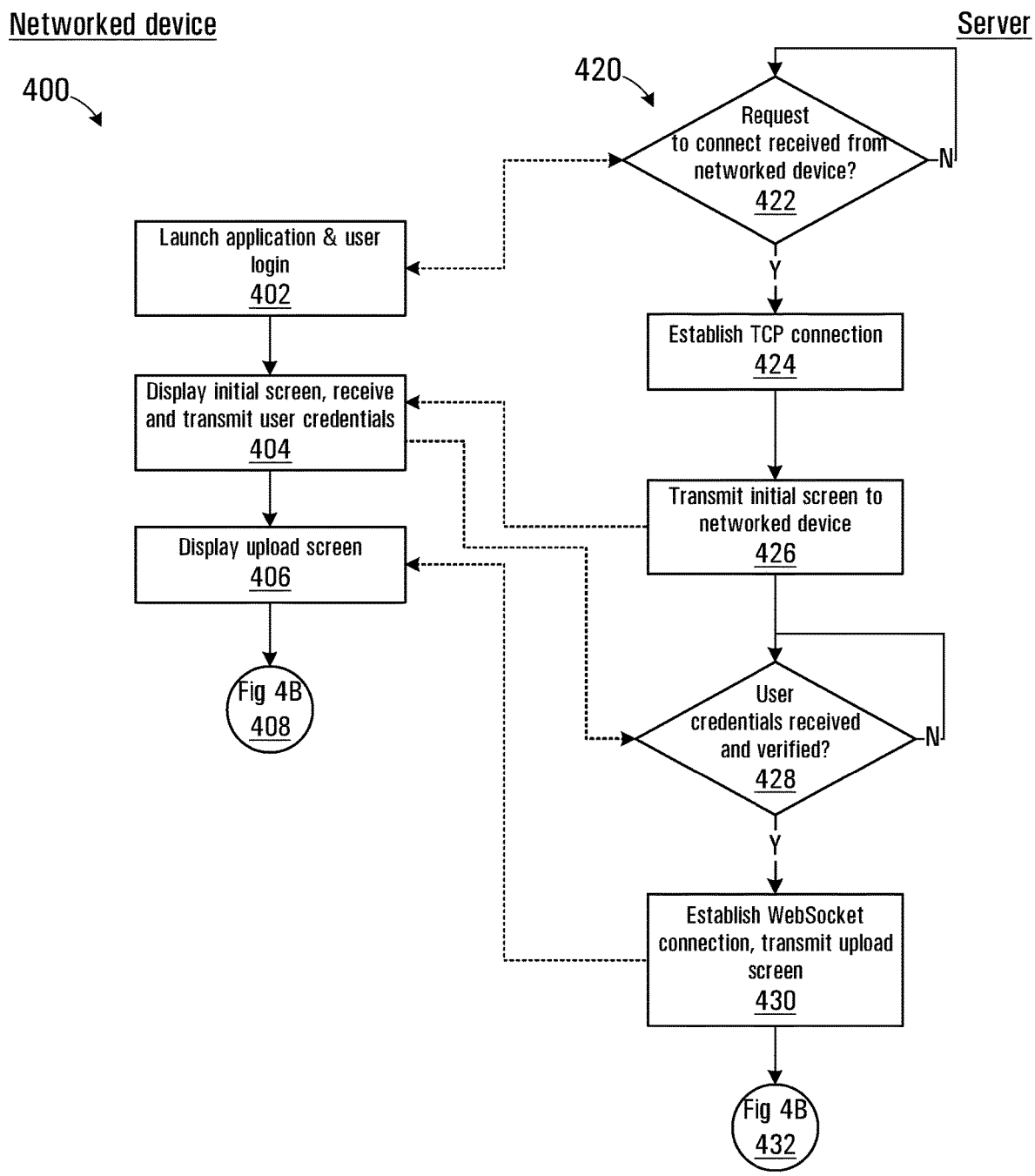
FIG. 4A, 4B is a process flowchart depicting blocks of code for directing the processor circuits in FIG. 2 and FIG. 3 to upload content from the networked device processor circuit to the server processor circuit.

Referring to FIG. 4A, a flowchart depicting blocks of code for directing the processor circuit 300 of the first networked device 114 to initiate an upload of content to the server processor circuit 104 is shown generally at 400. A flowchart depicting blocks of code for directing the server processor circuit 104 to receive and process the uploaded content is shown generally at 420. The blocks generally represent codes that may be read from the program memory 202 of the server processor circuit 104 or memory 310 of the networked device processor circuit 300 for directing the respective microprocessors 200 and 302 to perform various functions for uploading content. The actual code to implement each block may be written in any suitable program language, such as C, C++, C#, Java, JavaScript, and/or assembly code, for example.

The device upload process 400 starts at block 402 when the user 116 of the first networked device 114 causes the block of codes 314 in the memory 310 of the processor circuit 300 to be executed, which launches the content sharing application on the first networked device. The content sharing application may run as a stand-alone application or as a web application that runs within a browser window running on the first networked device 114.

The server upload process 420 begins at block 422, which directs the microprocessor 200 of the server 102 to determine whether a request to connect has been received from the first networked device 114. If a request to connect has not been received, block 422 is repeated. If a request to connect is received from the first networked device 114, block 422 directs the microprocessor 200 to block 424. Block 424 directs the microprocessor 200 to establish a Transmission Control Protocol (TCP) connection between the server 102 and the first networked device 114 via the communications interface 260 and the data network 108. Block 426 then directs the microprocessor 200 to transmit an initial screen to the first networked device 114.

The device upload process 400 then continues at block 404, which directs the microprocessor 302 to display the initial screen on the display 304. Referring to FIG. 5A, the initial screen displayed on the display 304 of the first networked device 114 is shown at 500 as a screenshot. The screen 500 includes fields and options for logging the user 116 of the first networked device 114 into the application. In this example, block 404 further directs the microprocessor 302 to request the user 116 to provide credentials such as a user identification (in the form of an email address in this case) and a password, or login using social media credentials. In some embodiments the user identification of the user 116 of the first networked device 114 may be transmitted to the server processor circuit 104, which may perform a user authentication of the user prior to providing content sharing services to the first networked device. Block 404 then directs the microprocessor 302 to transmit the user credentials to the server 102.

The server upload process 420 then continues at block 428, which directs the microprocessor to verify the credentials of the user 116 of the first networked device 114 against account information previous set up by the user. If the credentials are not verified at block 428, the microprocessor 200 is directed to notify the first networked device 114 of the incorrect user credentials and retransmit the initial screen. Block 428 is then repeated. If at block 428 the user credentials are verified, then the microprocessor 200 is directed to block 430. Block 430 directs the microprocessor 200 to open a WebSocket connection between the server 102 and the second networked device 118. The WebSocket connection facilitates two-way communication of data between the second networked device 118 and the server 102 via the TCP connection and allows notifications to be pushed to the second networked device 118 for display on the display 304. The WebSocket connection is established for communications only between the server and the first networked device 114. Each user of a networked device that launches and logs in to the application would thus have a separate WebSocket connection established between the networked device and the server 102. Block 430 then directs the microprocessor 200 to transmit an upload screen to the first networked device 114. The server upload process 420 then continues at block 432 on FIG. 4B.

The device upload process 400 continues at block 406, which directs the microprocessor 302 of the first networked device 114 to display the upload screen received from the server 102. The upload screen is shown in FIG. 5A as a screenshot. The screen 502 displays a link 504 for initiating the upload, which when selected or clicked by the user 116 causes a pop-up box 506 to be displayed, prompting the user to select content such as a photo or to browse saved content on the device. The process then continues at block 408 on FIG. 4B.

Figure 4B:
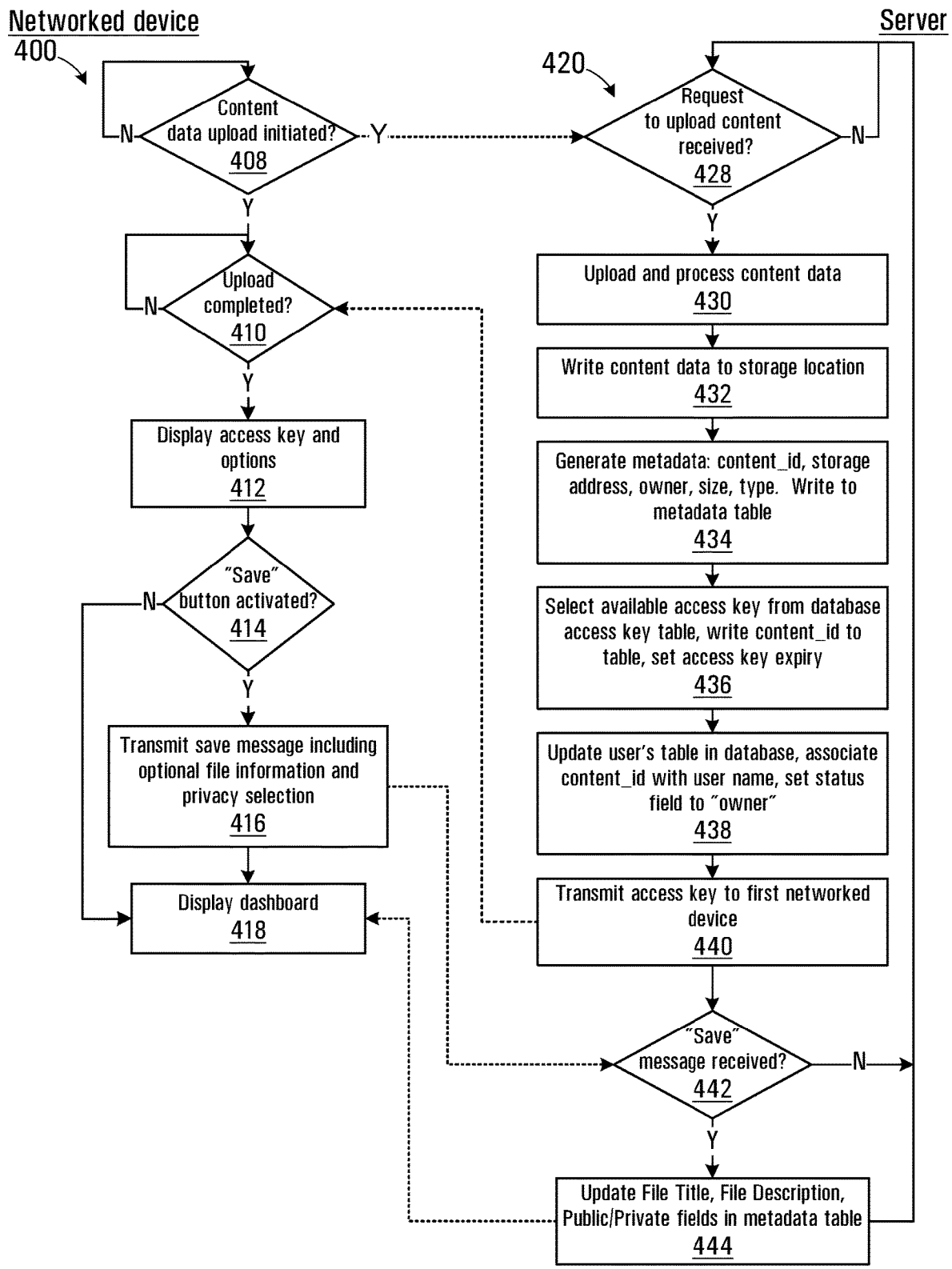

Referring to FIG. 4B, block 408 of the process 400 directs the microprocessor 302 to determine whether the user 116 of the first networked device 114 has initiated a request to upload content data. If at block 408, there is no request to upload content data, block 408 is repeated. If a request to upload content has been initiated at block 408, the microprocessor 302 is directed to transmit the request to the server 102 over the TCP connection. Block 408 then directs the microprocessor 302 to block 410.

The server upload process 420 then continues at block 428, which directs the microprocessor 200 to determine whether a request to upload content data has been received, and if not the microprocessor is directed to repeat block 428. If a request is received, block 428 directs the microprocessor 200 to block 430, which directs the microprocessor to upload and process the content data. In one embodiment, block 430 directs the microprocessor 200 to receive the content data uploaded over the data network 108 at the communications interface 260. Block 430 may also direct the microprocessor 200 to perform additional processing of the content data, such as determining a data size associated with the content and/or establishing compliance with criteria for storage of the content data in the network storage location 110. Block 430 may also direct the microprocessor 200 to perform a virus scan and/or malware scan on the content data. In some embodiments the content data may further be encrypted in accordance with the user's preferences to prevent unauthorized access.

In this embodiment block 430 further directs the microprocessor 200 to transmit updates to the first networked device 114 indicating a status of the upload and facilitating display of the a graphic 510 on the screen 508.

The device upload process 400 then continues at block 410, which directs the microprocessor 302 to determine whether the upload is completed. As disclosed above, the server 102 may transmit upload status messages to the first networked device 114, which may be used to monitor upload progress. Referring to FIG. 5C, a screen displayed on the display 304 of the first networked device 114 is shown at 508 as a screenshot and includes a graphic 510 indicating upload progress.

The process 420 then continues at block 432, which directs the microprocessor 200 to write the content data to a storage location. In embodiments, where the content data is to be stored in the network storage location 110, block 432 directs the microprocessor 200 to access the network storage in accordance with the network storage protocols. Network storage providers generally make application programming interface (API) available to subscribers that can be programmatically accessed for storing data to the storage location. Block 432 directs the microprocessor 200 to determine a storage address or URL (uniform resource locator) for writing and accessing the content data at the storage location 110. The storage address will typically include a portion identifying the network storage location on the data network 108, a portion identifying a bucket or storage resource assigned to the server 102, and a portion identifying the content data (for example "image.jpg"). Block 432 then directs the microprocessor 200 to access the storage API and to write the content data to the network storage location 110 at a location corresponding to the storage URL. If the API returns a status indicating that the write operation to the storage location 110 was successful, the process continues at block 434.

The content data store 242 in the mass storage unit 240 may only be used for short-term storage of content data while being processed in accordance with block 430. However, in other embodiments, the content data may be stored in the local content data store 242 of the mass storage unit 240 on a longer term basis.

Block 434 then directs the microprocessor 200 to generate metadata for the uploaded content data now stored in the storage location 110. In one embodiment the metadata is stored in a metadata database table 244 hosted by the networked database 112. An example of a metadata table is shown in FIG. 6A at 600. The metadata table 600 shown is configured for use with a Mongo DB and employs a JavaScript Object Notation (JSON) format. The metadata table 600 includes records 602-610, each of which is associated with a particular content data item in the storage location 110 and includes a plurality of data fields for holding metadata information associated with the associated data item. The metadata record 602 is associated with the content uploaded at block 432. Block 434 then directs the microprocessor 200 to generate a content_id, which is stored in a field 612 of the metadata record 602. In this embodiment the content_id is an alphanumeric string having 9 characters, which is randomly generated and uniquely associated with the content data uploaded at blocks 428-432. Block 434 further directs the microprocessor 200 to store the storage address of the content data in an address field 614 of the metadata record 602. The storage address or URL would have been generated by the server 102 when writing the content data to the storage location 110. In this case the address is for a content data item "Image.jpg", which is stored in a "Linkme" bucket in Amazon S3 storage.

Block 434 then directs the microprocessor 200 to save a user identifier in an owner field 616 of the metadata record 602. As noted above, when the screen 500 in FIG. 5A is displayed, the user 116 will have entered information such as an email address that permits the server to identify the user 116 of the first networked device 114. In some embodiments the server 102 will also allow the user 116 to associate their name with their email address. In this example the content data is owned by a user having a name of "Tom Stevens".

Block 434 further directs the microprocessor 200 to save the data size of the uploaded content data in a size field 618 of the record 602. As disclosed above, the processing at block 430 may involve determine a data size of the content data item uploaded by the second networked device 118. Block 434 also directs the microprocessor 200 to store an indication of the type of content data stored in the storage location 110 in a data type field 620 of the metadata record 602. A variety of different types of content may be uploaded and identified by the extension appended to the file (for example ".jpg" for a "JPEG" (Joint Photographic Experts Group) type image file. In this embodiment the metadata record 602 also includes additional fields 622-626 which will be described later herein.

The process 420 then continues at block 436, which directs the microprocessor 200 to associate an access key with the content data. In one embodiment the access key is selected form the access key table 246 in the networked database 112. An example of an access key table in JSON format is shown in FIG. 6B at 630. The access key table 630 includes a plurality of access key records 632-634, each including a plurality of data fields for holding information associated with a particular access key. For example, in the embodiment shown the access key record 632 includes an access key field 642 for holding an alphanumeric access keyword. In this embodiment the keyword is a meaningful word "Yerevan". The access key record 632 also includes a field 644 for holding the content_id, as described above in connection with the field 612 of the record 602 in the metadata table 600. The access key record 632 also includes a content_id field 644 and an expiry field 646. In this embodiment the expiry field 646 includes a date and a time in 24-hour time format.

Block 436 of the process 420 also directs the microprocessor 200 to determine a current date and time and then select a first record from the access key records 632-640 that has an expiry field prior to the current date. In one embodiment the access key table 630 in the networked database 112 may be pre-populated with a large number of records having unique access key values with the expiry set to the current date and time. Once an expired access key is found in the access key table 630, block 436 further directs the microprocessor 200 to determine and store an expiry for the access_key 642 in the expiry field 646 in the access key table 630. The expiry field 646 facilitates a determination as to whether the access key remains actively associated with the content data or has expired and is no longer associated with the content data. The expiry may be calculated on the based on a pre-determined or otherwise determined time period during which the access_key 642 is to be associated with the content data. As an example, the access_key 642 may be set to expire 24 or 48 hours after being associated with the content data. In another embodiment, users of the content sharing implemented by the server 102 may be able to sign up for a paid premium membership that entitles them to a longer time period before the access key expires, for example 90 days.

In other embodiments, the user 116 of the first networked device 114 may request the server 102 to extend the expiry of the access key 642 by an additional time period. For example, a user 116 having a paid membership may be permitted to extend the expiry of an access key for an additional 90 days on request to the server 102.

In some embodiments, the user 116 may be permitted to select their own alphanumeric keyword for use as an access key and expiry of the access key may be made dependent on a number of characters in the keyword. For example, shorter keywords like "Dog", "File", etc. may be set to expire within a few days, while longer keywords like "Vacation Photographs", which has 20 characters would be set to expire after a longer time period, for example after a week.

Referring again to FIG. 6B, the access key field 642 in this access key record 632 indicates that the access key "Yerevan" has been associated with the content data defined in the metadata record 602 that has the same content_id 612 corresponding to the content_id in the field 644 of the access key table 630. The access_key "Yerevan" has also been set to expire on Mar. 30, 2019 at 11:21.

The process 420 then continues at block 438, which directs the microprocessor 200 to update a user table in the networked database 112 for the owner of the content data. An example of a user table for the user 116 Tom Stevens in JSON format is shown in FIG. 6C at 650. The user table 650 includes a plurality of records. A record 652 includes a content_id field 654 that corresponds to the content_id fields 644 in the access key table 630 and content_id field 612 in the metadata table 600. The record 652 also includes an owner field 656 for holding an indication (i.e. "owner") that the content referenced in the content_id field 654 is owned by the user associated with the user table. Other user tables will also be generated for users of other devices such as the networked devices 118 and 122 shown in FIG. 1. For example, the user 120 of the second networked device 118 is named John Smith, and has had a user table 660 shown in FIG. 6D generated having records 662 and 664. In the record 662 of the user table 660 has a status field 670 set to "shared", indicating that the user 120 is not the owner of the content data referenced in a content_id field 668 of the record. The server upload process 420 then continues at block 440, which directs the microprocessor 200 to transmit the access key "HyKiJyOcm" to the first networked device 114.

The device upload process 400 then resumes at block 408, where having received the access key indicating that the upload is complete, the microprocessor 302 is directed to block 410. Referring to FIG. 5D, a screen displayed on a display 304 of the first networked device 114 when the upload has completed is shown at 512 as a screenshot. The screen 512 includes an indication 514 confirming that the upload has completed and a box 516 that displays the access key "Yerevan". At this stage the content data has been uploaded, saved in the storage location 110, and the networked database 112 tables updated. However the user 116 of the first networked device 114 may optionally provide additional input for association with the uploaded content data. The screen 512 includes an input box 518 for receiving a file title, an input box 520 for receiving a file description, a checkbox 522 for indicating whether the content data should be made "private", and a save button 524 for causing changes to the content to be saved.

The device upload process 400 then continues at block 414, which directs the microprocessor 302 to determine whether the save button 524 has been selected by the user 116 of the first networked device 114. If the save button 524 has been activated, the microprocessor 302 is directed to block 416 which directs the microprocessor to transmit changes to the information in the input boxes 518 and 520, or a change to the privacy checkbox 522 to the server 102. The process then continues at block 418, which directs the microprocessor 302 to display a content dashboard for listing content available to the user 116, which is described in more detail below.

The server upload process 420 continues at block 442, which directs the microprocessor 200 to determine whether a "save" message has been received from the first networked device 114. If a save message has been received, block 442 directs the microprocessor 200 to block 444, which directs the microprocessor to update the optional file information and/or the privacy setting. Referring back to FIG. 6A, the record 602 of the metadata table 600 includes a public_private field 622 for holding a value indicating whether the content is to be accessible by all other users or maintained private and only accessible to users permitted by the user 116 of the first networked device 114 to access the content. In one embodiment this field may be initially populated with a default value (for example "private"), which will be active unless the user 116 of the first networked device 114 changes the value. The metadata record 602 also includes a file_tide field 624 and the file_description field 626 for holding optional file title and description values provided by the user 116. When the save message includes a user privacy selection, block 444 directs the microprocessor 200 to write the privacy selection value to the public_private field 622 (in this case "private"). Similarly, if the save message includes a file title or file description, block 444 directs the microprocessor 200 to write these values to the file_tide field 624 and file_description field 626. The microprocessor 200 is then directed back to block 428 to await a further content data upload.

If at block 414 of the process 400, the save button 524 is not activated by the user 116 and the screen 512 is simply closed by the user (for example by closing a browser window displaying the screen), then the microprocessor 302 is directed to block 418 and the content dashboard is displayed. In this case the content data is saved with a default privacy setting (typically the content data will be public), and without any additional file information. If at block 442 of the server upload process 420, no save message is received at the server then the microprocessor 200 is directed back to block 428, to await a further content data upload.

Figure 7A:
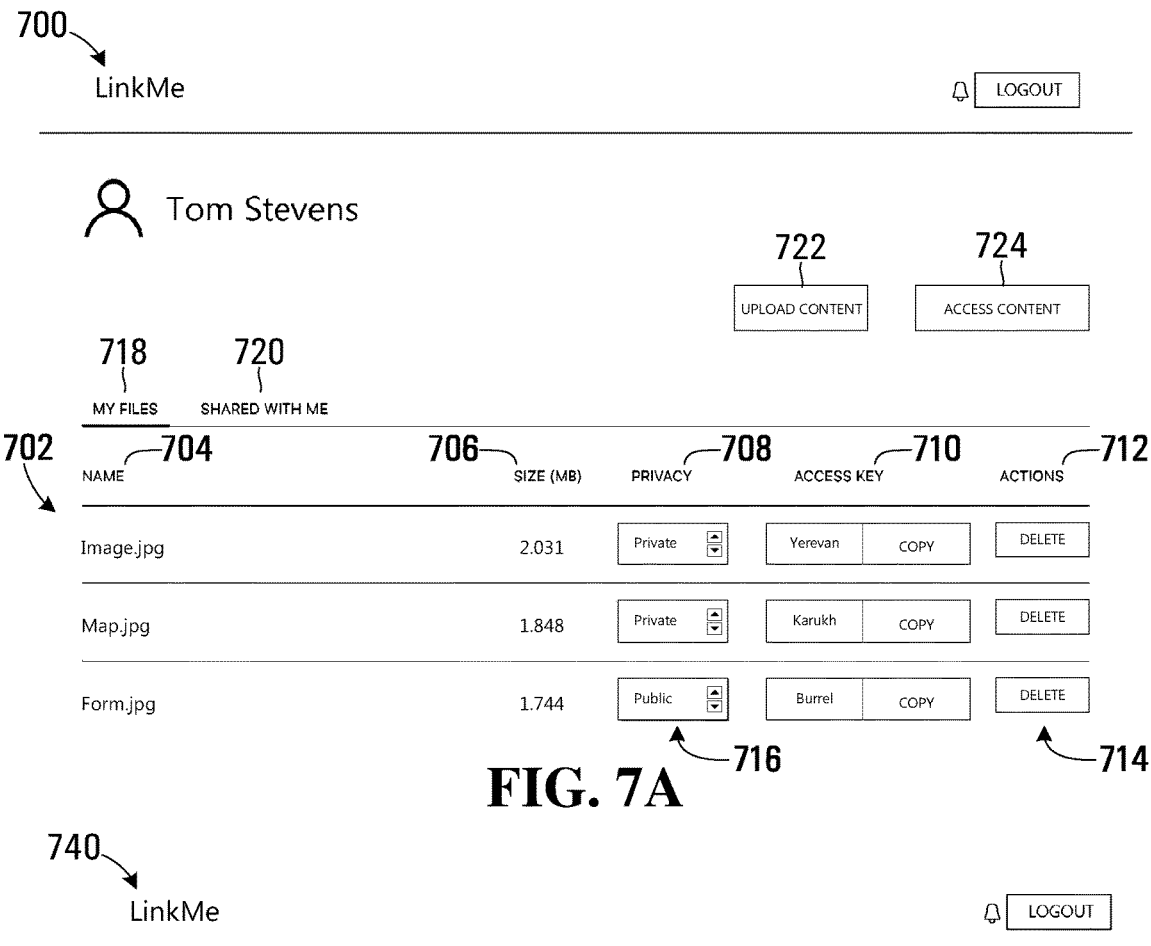
FIG. 7A is a screenshot of a content dashboard screen displayed on a display of a first networked device.

Referring to FIG. 7, a content dashboard screen displayed on any of the devices 114, 118, or 122 is shown at 700 as a screenshot. In one embodiment, the content dashboard screen 700 is displayed when the user 116 activates the save button 524. Alternatively, the screen 700 may be a first screen displayed to the user 116 after the login screen 500 has been displayed and the user 116 has entered their credentials. The content dashboard screen 700 includes a listing of content items 702. The listing 702 includes a content name column 704, a content size column 706, a privacy setting column 708, an access key column 710, and an actions column 712. The actions column 712 includes a plurality of "delete" buttons 714 associated with each item in the listing 702. The privacy setting column 708 includes a plurality of privacy controls 716 associated with each item in the listing 702. The content dashboard screen 700 has two tabs including a first tab 718 and a second tab 720. In the example shown in FIG. 7, the first tab 718 is underlined to show that the listing 702 below is associated with files owned by the user 116 "Tom Stevens". The second tab 720, when activated, will show a listing (not shown) of content data currently being shared by other users with the user 116 "Tom Stevens". The content dashboard screen 700 also includes an "upload" button 722, which when activated by the user 116 initiates the content data upload process 400 described above. The content dashboard screen 700 also includes an "access a file" button 724, which when activated initiates a content data access process described later herein.

In the above embodiment the access key has been described with reference to an alphanumeric keyword, which can be represented as a character string in the access key table 630 stored in the networked database 112. The alphanumeric keyword may include common words, letter sequences, number sequences such as a telephone number, and mixed letter and number sequences such as a vehicle license plate or portion of an address. In other embodiments the access key may be otherwise implemented, as described later herein.

Content Dashboard

Figure 8A:
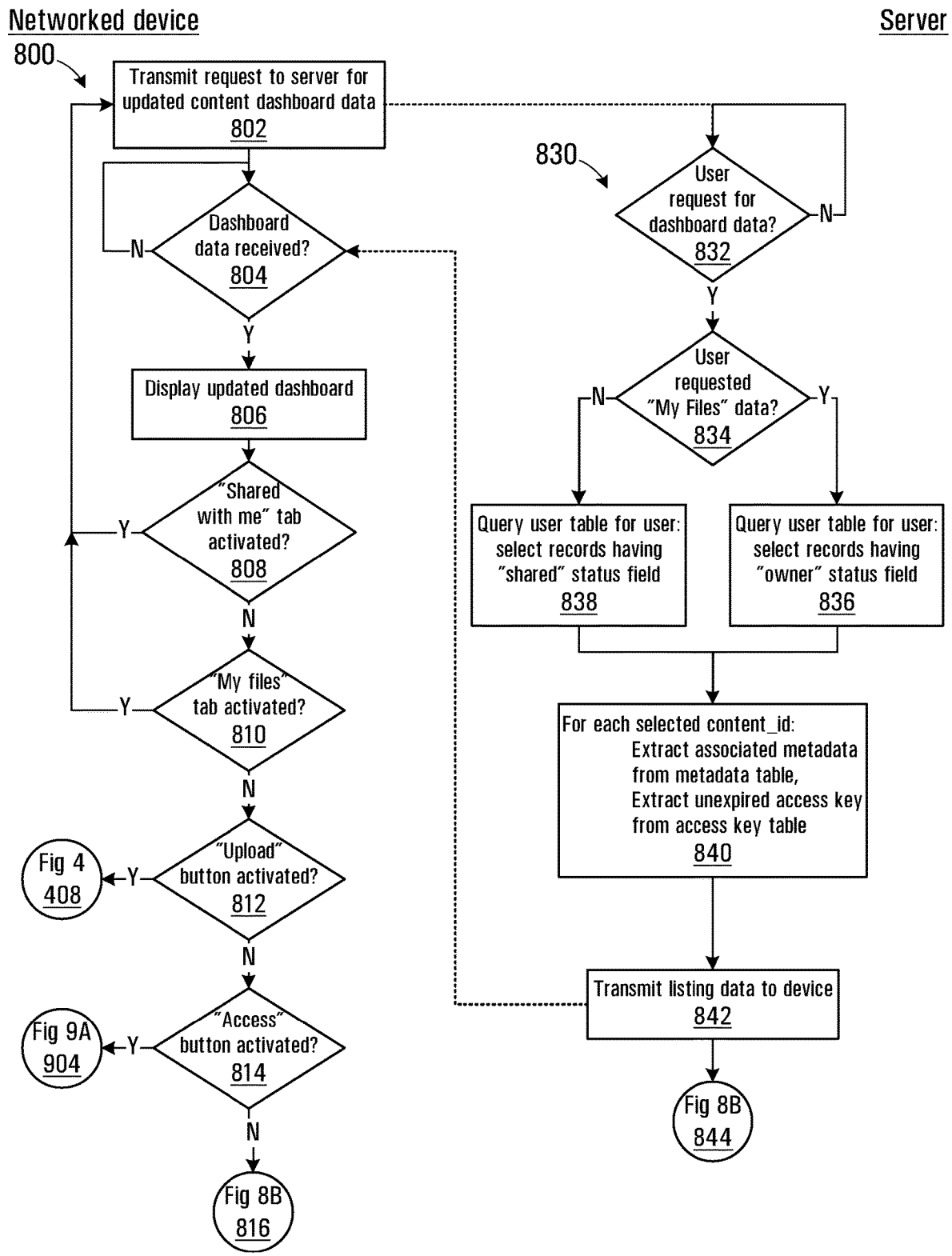
FIG. 8A, 8B is a process flowchart depicting blocks of code for directing the processor circuits in FIG. 2 and Figure to display the content dashboard screens shown in FIG. 7A and FIG. 7B.

Referring to FIG. 8A, a flowchart depicting blocks of code for directing the processor circuit 300 of the first networked device 114 to implement block 418 of the process 400 for displaying the content dashboard is shown generally at 800. The dashboard display process 800 begins at block 802, which directs the microprocessor 302 to transmit a request to the server 102 for updated content dashboard data. A process implemented at the server 102 to handle the request for updated content dashboard data is shown at 830. The server dashboard update process 830 begins at 832, which directs the microprocessor 200 to determine whether a request for content dashboard data has been received. If no request is received, block 832 directs the microprocessor 200 to repeat block 832. If at block 832, a request has been received, the microprocessor 200 is directed to block 834. As noted above, the content dashboard screen 700 includes the first tab 718 for listing content data uploaded and owned by the user 116 of the first networked device 114 and a second tab 720 for listing shared content data. In one embodiment, the content dashboard screen 700 is initially displayed with the first tab 718 activated. Block 834 directs the microprocessor 200 to determine whether the user 116 has requested display of data owned by the user, in which case the microprocessor is directed to block 836. Block 836 directs the microprocessor 200 to query the user table for the user Tom Stevens shown in FIG. 6C to select all records having the status field 656 set to "owner" (in this case all three records).

If at block 834, the display of data shared with the user 116 by other users is requested, the microprocessor 200 is directed to block 838. Block 838 directs the microprocessor to query the user table shown in FIG. 6C to select all records having the status field 656 set to "shared". In this example, the user 116 has no shared content data.

Following execution of either block 836 or 836, a set of content_id values would have been selected and the process 830 then continues at block 840. Block 840 directs the microprocessor 200 to query the metadata table for records corresponding to the set of selected content_id values. Block 840 directs the microprocessor 200 to extract values for the field_title field 624, size field 618 and the public_private field 622. Block 840 also directs the microprocessor 200 to query the access key table 630 (FIG. 6B) for records corresponding to the set of selected content_id values and to read any access_key values 642 that have not yet expired. This step involves the microprocessor 200 comparing the expiry field 646 for each matching record to the current date and time to determine whether the access_key 642 value is still active.

The server dashboard update process 830 then continues at block 842, which directs the microprocessor 200 to transmit content dashboard data to the first networked device 114. The listing data will include, for each selected content_id value, the file_title value 624, the size value 618, the public_private value 622, and the access key value 642 (if still unexpired) all read from the metadata record 602. If the access key had already expired there would be little point in reading and transmitting this value to the user. Block 844 then directs the microprocessor 200 to block 844 in FIG. 8B.

The dashboard display process 800 then continues at block 804 when content dashboard data is received at block 804 and the microprocessor 302 is directed to block 806. Block 806 directs the microprocessor 302 is to display the data in the columns 704-710 as shown in FIG. 7. Block 808 then directs the microprocessor 302 to determine whether the "Shared with Me" second tab 720 has been activated, in which case the microprocessor is directed back to block 802 and a request for updated content dashboard data is transmitted as described above. If at block 808, the "Shared with Me" second tab 720 has not been activated then the process continues at block 810, which directs the microprocessor 302 to determine whether the "My files" first tab 718 has been activated. If the first tab 718 has been activated, block 810 directs the microprocessor 302 back to block 802 and a request for updated content dashboard data is transmitted as described above.

If at block 810, the second tab 720 has not been activated then the process continues at block 812, which directs the microprocessor 302 to determine whether the "upload" button 722 has been activated. If the "upload" button 722 has been activated, block 812 directs the microprocessor to block 408 of the device upload process 400 shown in FIG. 4, and the upload process is executed as described above.

If at block 812, the "upload" button 722 has not been activated then the process continues at block 814, which directs the microprocessor 302 to determine whether the "access a file" button 724 has been activated. If the "access a file" button 724 has been activated, block 814 directs the microprocessor to block 904 of a content access request process 900 shown FIG. 9A (described later herein). If at block 814, the button 724 has not been activated then the process continues at block 816 on FIG. 8B.

Figure 8B:
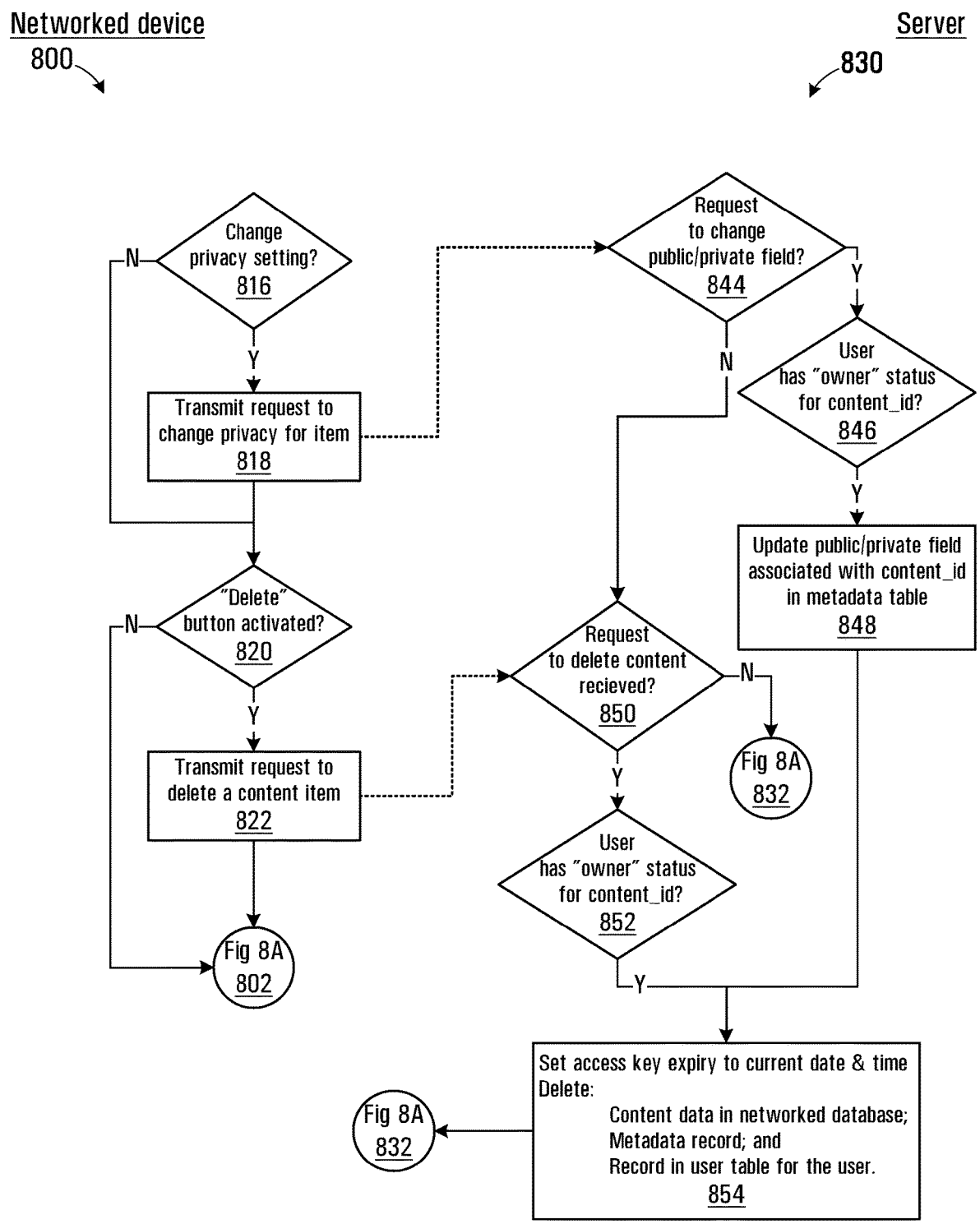

Referring to FIG. 8B, block 816 directs the microprocessor 302 to determine whether any of the plurality of privacy controls 716 has been activated, in which case the microprocessor is directed to block 818. Block 818 directs the microprocessor 302 to transmit a request to the server 102 to change the privacy for the associated item in the listing 702. The server dashboard update process 830 then continues at block 844, which directs the microprocessor 200 of the server 102 to determine whether a request has been received from the first networked device 114 to change the public_private field 622 in the metadata record 602 in the metadata table 600. If a request to change the public_private field 622 has been received, block 844 directs the microprocessor 200 to block 846. Block 846 directs the microprocessor 200 to determine whether the user 116 of the first networked device 114 is the owner of the content data identified in the request. In one embodiment, block 846 directs the microprocessor 200 to read the owner field 616 in the metadata record 602 metadata record 602 in the metadata table 600 to determine whether the user of the first networked device 114 making the request matches the value in the owner field 616. Alternatively, block 846 could direct the microprocessor 200 to query the user table 650 for the user making the request (for example, Tom Stevens) to determine whether the content data item in the table has the status field 656 set to "owner". In either case, if the user making the request is the owner of the content data then the process continues at block 848. Block 848 directs the microprocessor 200 to update the public_private field 622 in the metadata record 602 in the metadata table 600 to reflect the requested change.

The dashboard display process 800 then continues at block 820 if either block 818 has completed, or if at block 816 it is determined that no change to the privacy settings is required. Block 820 directs the microprocessor 302 to determine whether any of the plurality of "delete" buttons 714 has been activated. If none of the plurality of "delete" buttons 714 has been activated, block 820 directs the microprocessor 302 back to block 802 in FIG. 8A and the dashboard display process 800 is repeated. If one of the plurality of "delete" buttons 714 has been activated, the microprocessor 302 is directed to block 822, which directs the microprocessor to transmit a request to delete the associated content item to the server 102. The microprocessor 302 is then directed back to block 802 in FIG. 8A and the dashboard display process 800 is repeated.

The server dashboard update process 830 then continues at block 850, which directs the microprocessor 200 of the server 102 to determine whether a request to delete a content item has been received from the first networked device 114. If a request to delete a content item has been received, block 850 directs the microprocessor to block 852, which directs the microprocessor to determine whether the user 116 of the first networked device 114 is the owner of the content data identified in the request. If the user making the request is the owner of the content data then the process continues at block 854. Block 854 directs the microprocessor 200 to set expiry field 646 in the record 632 of the access key table 630 to the current date and time, such that the access key will remain in the networked database 112 as an available expired access key. Block 854 also directs the microprocessor 200 to read the address in the address field 614 of the metadata record 602 in the metadata table 600 and to delete the corresponding content data located in the networked database 112 at the storage address. Block 854 then directs the microprocessor to delete the entire metadata record 602. Finally block 854 also directs the microprocessor to update the user table 650 for the user 116 by deleting the user record 652 corresponding to the content item. Block 854 then directs the microprocessor 200 back to block 832 on FIG. 8A and the dashboard display process 800 is repeated. If at block 850 no request to delete content has been received, the microprocessor 200 is directed back to repeat the process starting at block 832.

The content dashboard screen 700 thus provides a convenient listing 702 of content owned by the user 116 of the first networked device 114, and facilitates easy access to the content. The content dashboard screen 700 further provides access to content uploading functions via the "upload" button 722, privacy settings via the privacy controls 716, and the ability to delete content via the "delete" buttons 714.

Downloading Content Data

Figure 9A:
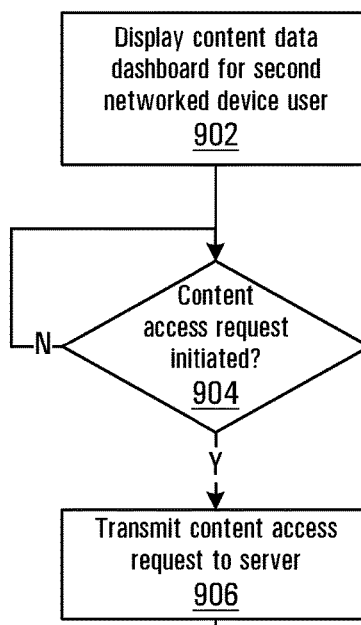
FIG. 9A-9E is a process flowchart depicting blocks of code for directing the processor circuits in FIG. 2 and FIG. 3 to process a content access request.
Figure 9A:
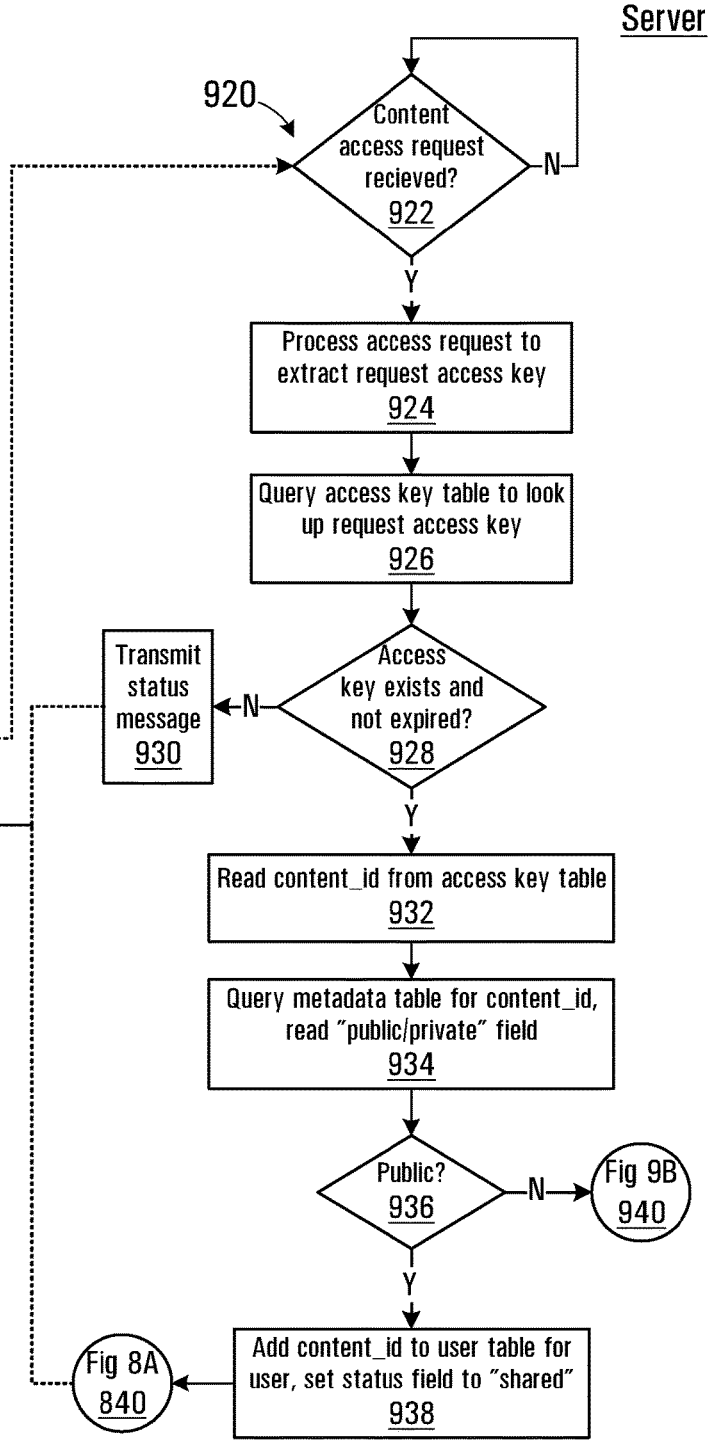

Referring to FIG. 9A, a flowchart depicting blocks of code for directing the processor circuit 300 of the second networked device 118 to initiate a content access request is shown generally at 900. A flowchart depicting blocks of code for directing the server processor circuit 104 to handle the access request is shown generally at 920. The processes 900 and 920 are described in the context of the user 120 of the second networked device 118 requesting access to the content item uploaded by the user 116 of the first networked device 114 in accordance with the device upload process 400 shown in FIGS. 4A and 4B. The content access request process 900 implemented by the second networked device 118 starts at block 902 when a user 120 of the second networked device 118 causes a content dashboard screen 740 shown as a screenshot in FIG. 7B to be displayed. The content dashboard screen 740 is similar to the content dashboard screen 700 for the user 120 of the first networked device 114, with the exception of a listing 744 that includes different content items and the different user name "John Smith" associated with the user 120 of second networked device 118. The content dashboard screen 740 includes a first tab 750 ("My files") and a second tab 752 ("shared with me"), but in this example the second tab is activated and thus a listing 744 includes files that have been shared by other users with the user 120.

The content access request process 900 continues at block 904, which directs the microprocessor 302 determine whether an "Access Content" button 742 on the screen 740 has been activated by the user 120. If the Access Content" button 742 has been activated, block 904 directs the microprocessor 302 to change the content dashboard screen 740 to include an access key entry box 746 and an access key request button 748. In this example, the user 120 of the second networked device 118 enters the access key "Yerevan", which is associated with the content uploaded by the user 116 in accordance with the device upload process 400. Block 904 then directs the microprocessor 302 to determine whether an access request has been initiated by the user 120 entering an access key in the access key entry box 746 and activating the access key request button 748. Until the button 748 is activated, block 904 directs the microprocessor 302 to repeat block 904. When the access key request button 748 is activated, block 904 directs the microprocessor 302 to block 906, which directs the microprocessor to transmit a content access request including a request access key to the server 102 using a TCP connection established with the server 102 over the data network 108. The content access request process 900 then continues at block 908, which directs the microprocessor 302 to await receipt of updated content dashboard data from the server.

The access request handling process 920 begins at block 922, which directs the microprocessor 200 of the server 102 to determine whether a content access request has been received from a networked device, such as the second networked device 118. When the content access request transmitted by the second networked device 118 at block 906 is received, the microprocessor 200 is directed to block 924. Block 924 directs the microprocessor 200 to process the content access request to extract the request access key (in this case the characters making up the alphanumeric access key "Yerevan"). Block 926 then directs the microprocessor 200 to perform a database query of the access key table 630 in the networked database 112. The process 920 then continues at block 928, which directs the microprocessor 200 to determine whether the query performed on the access key table 630 at block 926 returned a result. If no access key matching the request access key is found in the access key table 630, it may be that the user 120 of the second networked device 118 had incorrectly entered the access key. If at block 928, the microprocessor 200 determines that there is an access key in the access key record 632 that matches the request access key, block 928 further directs the microprocessor 200 to read the expiry field 646 in the record 632 and to determine whether the access key has expired. If at block 928, the request access key does not match any records in the access key table 630 or the access key is found in the access key table but has expired, block 928 directs the microprocessor 200 to block 930. Block 930 directs the microprocessor 200 to transmit a status message to the second networked device 118 indicating that the access key that was entered is not associated with any content data stored in the storage location 110. In one embodiment the status message when received at block 908, causes the microprocessor 302 to display the status message on the second networked device 118 as a pop-up box (not shown) on the content dashboard screen 740.

Figure 7B:
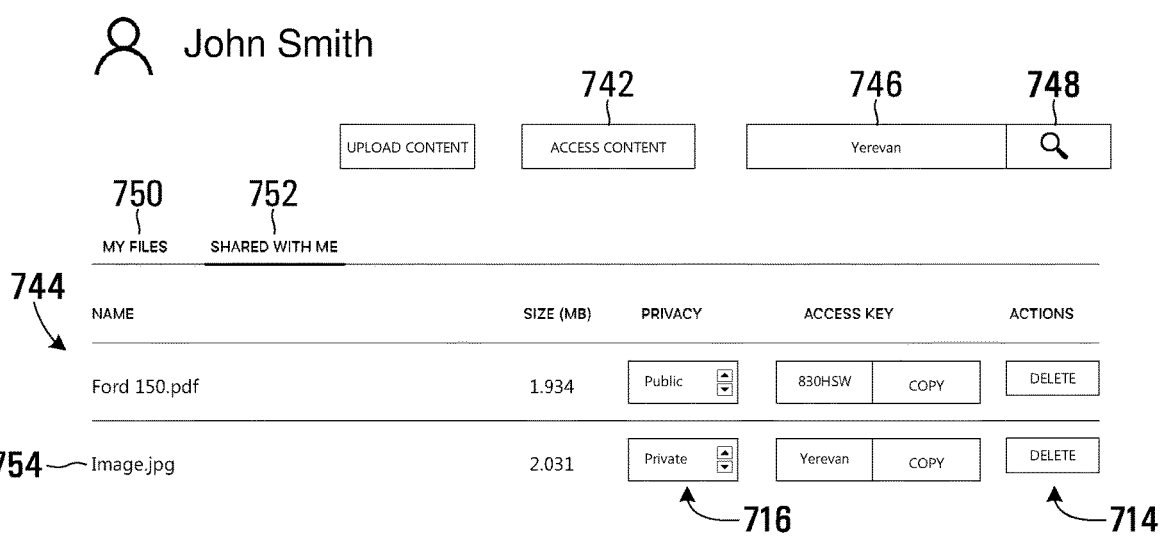
FIG. 7B is a screenshot of a content dashboard screen displayed on a display of a second networked device.

In the example shown in FIG. 7B where the request access key is "Yerevan", this access key appears in the access key field 642 of the access key record 632 in FIG. 6B, and is thus determined to exist. Further, if the microprocessor 200 determines that the expiry field 646 holds a later time and date value than the current time and date, the access key "Yerevan" is determined to remain actively associated with content data stored in the storage location 110.

The process 920 then continues at block 932, which directs the microprocessor 200 to read the content_id field 644 of the access key record 632 in the access key table 630. Block 934 then directs the microprocessor 200 to query the metadata table 600 using the value in the content_id field 644 to select the an applicable metadata record 602 in the metadata table 600 (i.e. record 602 in this example).

Public Content Download

Block 936 then directs the microprocessor 200 to determine whether the public_private field 622 in the metadata record 602 is set to "public", in which case the microprocessor is directed to block 938. Block 938 directs the microprocessor 200 add a new record 666 to the user table 660 for the user 120 of the second networked device 118 (shown in FIG. 6D). The new record 666 includes the content_id field 668 set to the access key "HyKiJyOcm" and the status field 670 set to "shared", indicating that the user 120 is not the owner of the content referenced in the content_id field. Block 938 then directs the microprocessor 200 back to block 840 of the server dashboard update process 830 shown in FIG. 8A for updating the content dashboard screen 740 on the display 304 of the second networked device 118. Blocks 840 and 842 cause updated content dashboard data to be transmitted to the second networked device 118.

The content access request process 900 resumes at block 908 when updated content dashboard data or a status message transmitted at block 930 is received. When the content dashboard data is received the microprocessor 302 is directed to block 806 of the dashboard display process 800 shown in FIG. 8A for updating the content dashboard screen 740.

Private Content Download

Figure 9B:
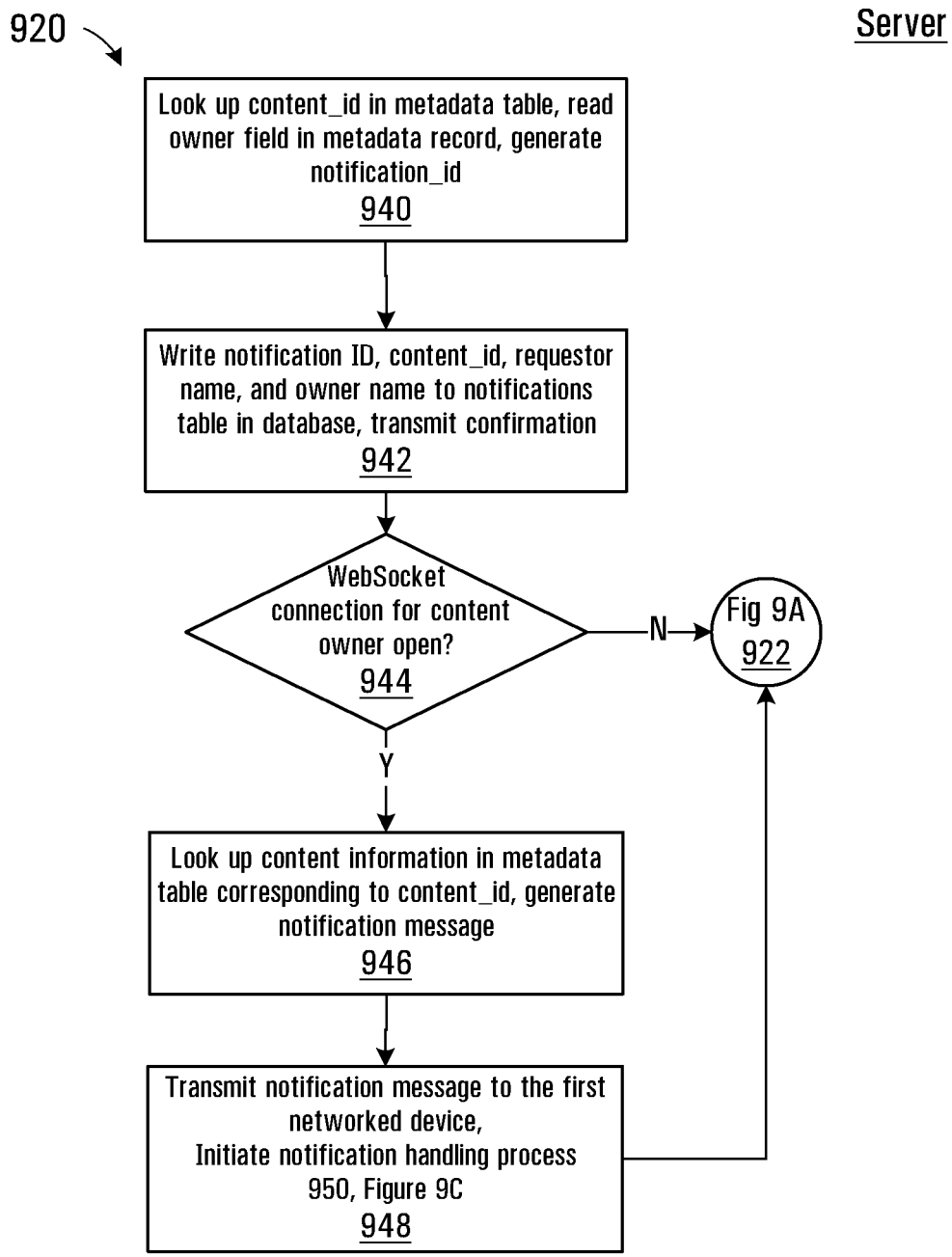

If at block 936, the microprocessor 200 determines that the public_private field 622 is not set to "public", then the public_private filed is set to "private" and the microprocessor is directed to block 940 (shown in FIG. 9B). In the example described herein the content data associated with the access key "Yerevan" has been designated by the user 116 of the first networked device 114 as "private" content. Block 940 directs the microprocessor 200 to query the metadata table 600 for the content_id read at block 932 and to read the owner field 616 in the metadata table to determine the owner of the content (in this case Tom Stevens). Block 940 also directs the microprocessor 200 to generate a notification_id. In one embodiment the notification_id may be an alphanumeric string having 9 characters, which is randomly generated and uniquely associated with the notification record 682.

The access request handling process 920 then continues at block 942, which directs the microprocessor 200 of the server 102 to write a new record to a notifications table, shown in FIG. 6E at 680. In the example shown, a single notification record 682 includes a notification_id field 684, a content_id field 686, an owner field 688, and a requestor field 690. The notification ID field 684 in this embodiment is set to "hj7Ytksf6" and the content_id field 686 to "HyKiJyOcm", which corresponds to the content referenced by the access key "Yerevan" in the metadata record 602. While only a single notification record 682 is shown in the notifications table 680, the table will typically include several notification records for content owned by different users. Block 942 may further direct the microprocessor 200 to transmit a confirmation message to the second networked device 118. The confirmation message confirms for the user 120 that access to the private content identified by the request access key has been requested. The confirmation message may be displayed as a pop-up box (not shown) displayed over the content dashboard screen 740 on the second networked device 118.

The process then continues at block 944, which directs the microprocessor 200 to determine whether the server 102 already has WebSocket connection open with the owner of the private content identified by the request access key (i.e. the first networked device 114). If at block 944 a WebSocket connection is open this indicates that the owner of the content data being requested is currently using the content sharing application and block 952 directs the microprocessor to block 946. Block 946 directs the microprocessor 200 to look up the metadata record 602 in the metadata table 600 and to generate a notification message. In one embodiment the notification message includes an identification of the content data being requested by including information from the metadata record 602 such as any or all of the file_title field 624, the file_description field 626, data type field 620, and the data size field 618. The notification message also includes the name of the requestor (i.e. the name of the user 120 of the second networked device 118). Block 948 then directs the microprocessor 200 to transmit the notification message to the first networked device using the open Web-Socket connection. The notification may be displayed as a pop-up on a screen currently displayed on the display 304 of the first networked device 114 and may additionally include buttons to grant or deny access to the content data. Block 948 of the server process 920 then directs the microprocessor 200 to initiate a notification handling process shown at 950 in FIG. 9C. Block 950 then directs the microprocessor 200 back to block 922 to await further download requests.

Figure 9C:
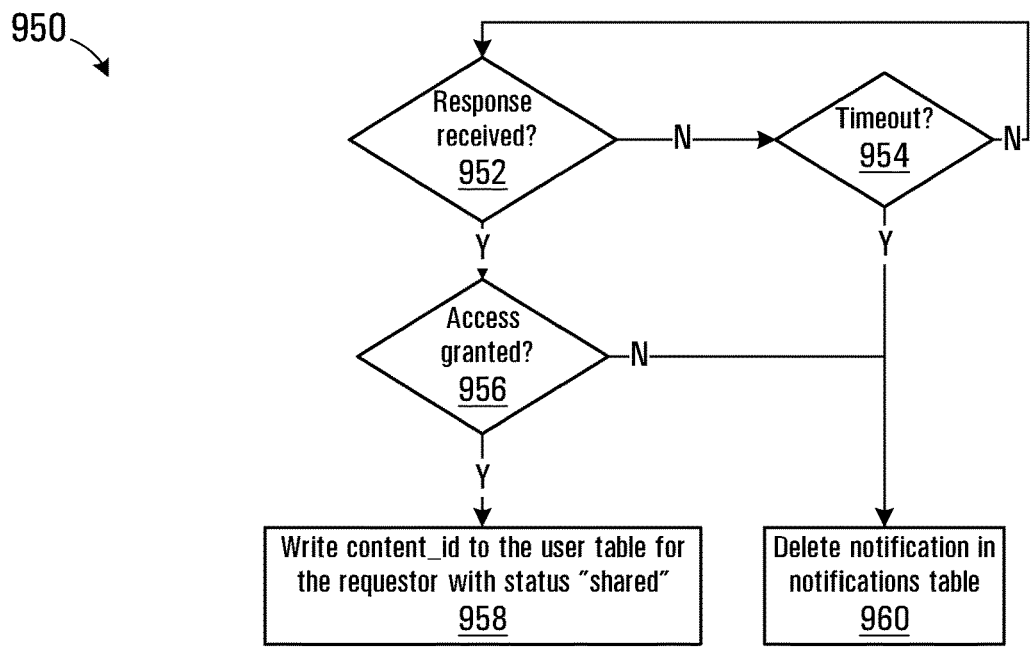

Referring to FIG. 9C, the notification handling process 950 is implemented on the server 102 for handling a notification response from the first networked device 114. Block 952 directs the microprocessor to determine whether a response has been received from the first networked device 114. If no response is received at block 952, the microprocessor 200 is directed to block 954, which directs the microprocessor to determine whether a timeout period associated with the request has expired. If the timeout has not yet expired, block 954 directs the microprocessor 200 back to block 952, which is repeated. If at block 952, a response is received from the first networked device 114, the microprocessor 200 is directed to block 956. Block 956 directs the microprocessor 200 to determine whether access to the data content for the user 120 has been granted by the user 116 of the first networked device 114. If access has been granted, block 956 directs the microprocessor 200 to block 958, which directs the microprocessor to write the content_id to the user table 660 for the user 120 (John Smith) shown in FIG. 6D. Referring back to FIG. 6D, the record 666 has been written to with a content_id field 672 set to "HyKiJyOcm" and a status field 674 set to "shared". Block 958 thus has the effect of causing the content data item to be added to the content that is accessible by the user 120. When the second networked device 118 next updates their content dashboard screen shown in FIG. 7B at 740, the content data item 754 will be displayed in the content listing 744 as shown at 754.

If at block 954 the timeout period expires, or at block 958 the response from the user 116 of the first networked device 114 declines to grant access to the data content, then the microprocessor 200 is directed to block 960 and the notification record 682 corresponding to the content-id "HyKiJyOcm" is deleted from the notifications table 680.

If at block 944 of the access request handling process 920, no WebSocket connection is open for the first networked device 114, the microprocessor 200 of the server 102 is directed back to block 922 to await and process further content requests. In this embodiment, when the user 116 of the second networked device 118 is not currently connected to the server via a WebSocket connection, the notification is deferred until a time that the user logs in to the application again.

Figure 9D:
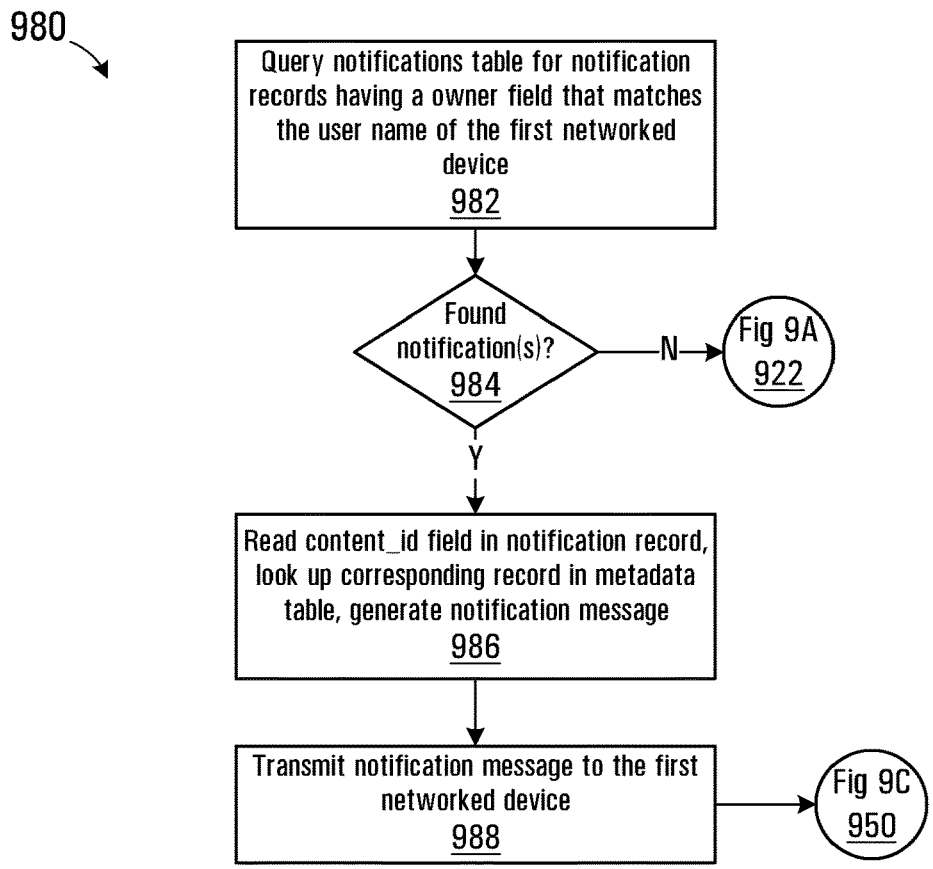

Referring to FIG. 9D, a process implemented on the server 102 for transmitting deferred notification requests to a user such as the user 116 of the first networked device 114 is shown generally at 980. The process 980 is executed whenever a user of a networked device launches the application and logs in. The process 980 is described in the context of generating a notification for transmission to the user 116 of the first networked device 114 indicating that the user 120 of the second networked device 118 has requested access to content data owned by the user of first networked device. The server deferred notification process 980 begins at block 982, when the user 116 of the first networked device 114 launches the application and logs in via the screen 500 shown in FIG. 5A, as described above. Block 982 then directs the microprocessor 200 to query the notifications table 680 for any records having an owner field 688 matching the name of the user (in this case the user 116 "Tom Stevens").

The process 980 then continues at block 984, which directs the microprocessor 200 to determine whether any matching notification records exist. If a matching notification record exists (such as the record 682) the process continues at block 986. Block 986 directs the microprocessor 200 to read the content_id field 686 in the notifications table 680 and to look up metadata corresponding to the content_id in the metadata table 600 (i.e. the metadata record 602 in this case). Block 986 also directs the microprocessor to generate a notification message generally as described above in connection with block 946. In this case the name of the requestor is read from the requestor field 690 in the notifications table 680 for inclusion in the notification message. Block 948 then directs the microprocessor 200 to transmit the notification message to the first networked device using the open WebSocket connection for the first networked device 114. Block 948 also directs the microprocessor 200 to initiate a notification handling process 950, shown in FIG. 9C and directs the microprocessor 200 back to block 922 to await further download requests.

Figure 9E:
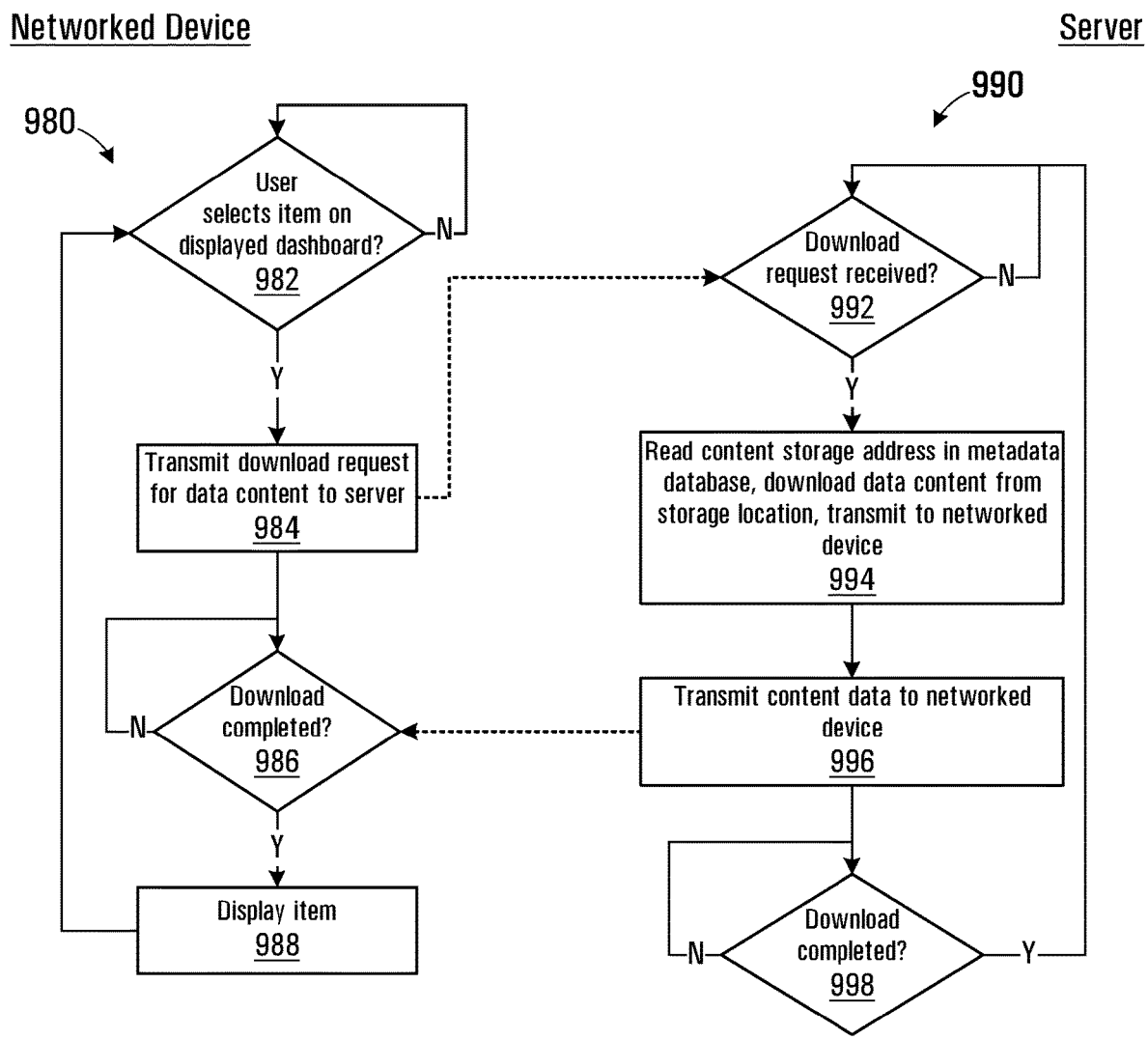

Referring to FIG. 9E, a process implemented on the second networked device 118 for requesting a download of a content data item listed in the listing 744 of the content dashboard screen 740 is shown generally at 980. A process implemented on the server for handling the request to download the content data item is shown generally at 990. The networked device process 980 begins at block 982, when the user 120 of the second networked device 118 selects one of the content data items in the listing 744. If at block 982 a content data item is selected from the content listing 744, the microprocessor 302 is directed to block 984. If no item is selected at block 982, the microprocessor 302 is directed back to repeat block 982. Block 984 directs the microprocessor 302 to generate and transmit a request to the server 102 to download the content associated with the selected data content item. In the discussion following it will be assumed that the content data item 754 has been selected for download by the user 120 of the second networked device 118. The request to download the content associated with the selected data content item would need to include an identification of the content, such as for example the Name "Image.jpg" and size "2.031" to permit the server 102 to identify the content being requested.

The process 990 begins at block 992, which directs the microprocessor 200 of the server 102 to determine whether a download request has been received from the second networked device 118. If a request has been received, block 992 directs the microprocessor 200 to block 994. Block 994 directs the microprocessor to look up the content record by content_id in the metadata table 600 (i.e. in this example the metadata record 602) and to read the address field 614 in the record. Block 994 then directs the microprocessor 200 to download the data content from the storage location 110 at the address held in the address field 614. Block 996 then directs the microprocessor 200 to transmit the content data to the second networked device 118 as a download stream. Block 998 then directs the microprocessor 200 to monitor the progress of the download, and when completed block 998 directs the microprocessor back to block 992 to await further download requests.

The networked device process 980 continues at block 986 which directs the microprocessor 302 of the second networked device 118 to determine whether the download is completed. When completed, block 986 directs the microprocessor to block 988, which directs the microprocessor 302 to call an operating system function in the block of program codes 220 of the program memory 202 (FIG. 2) to cause the downloaded data to be displayed. For example, where the data content is an image, an operating system function that causes images to be displayed may be invoked so that the image is displayed on the display 304 of the second networked device 118.

Access Key Assignment

Figure 10:
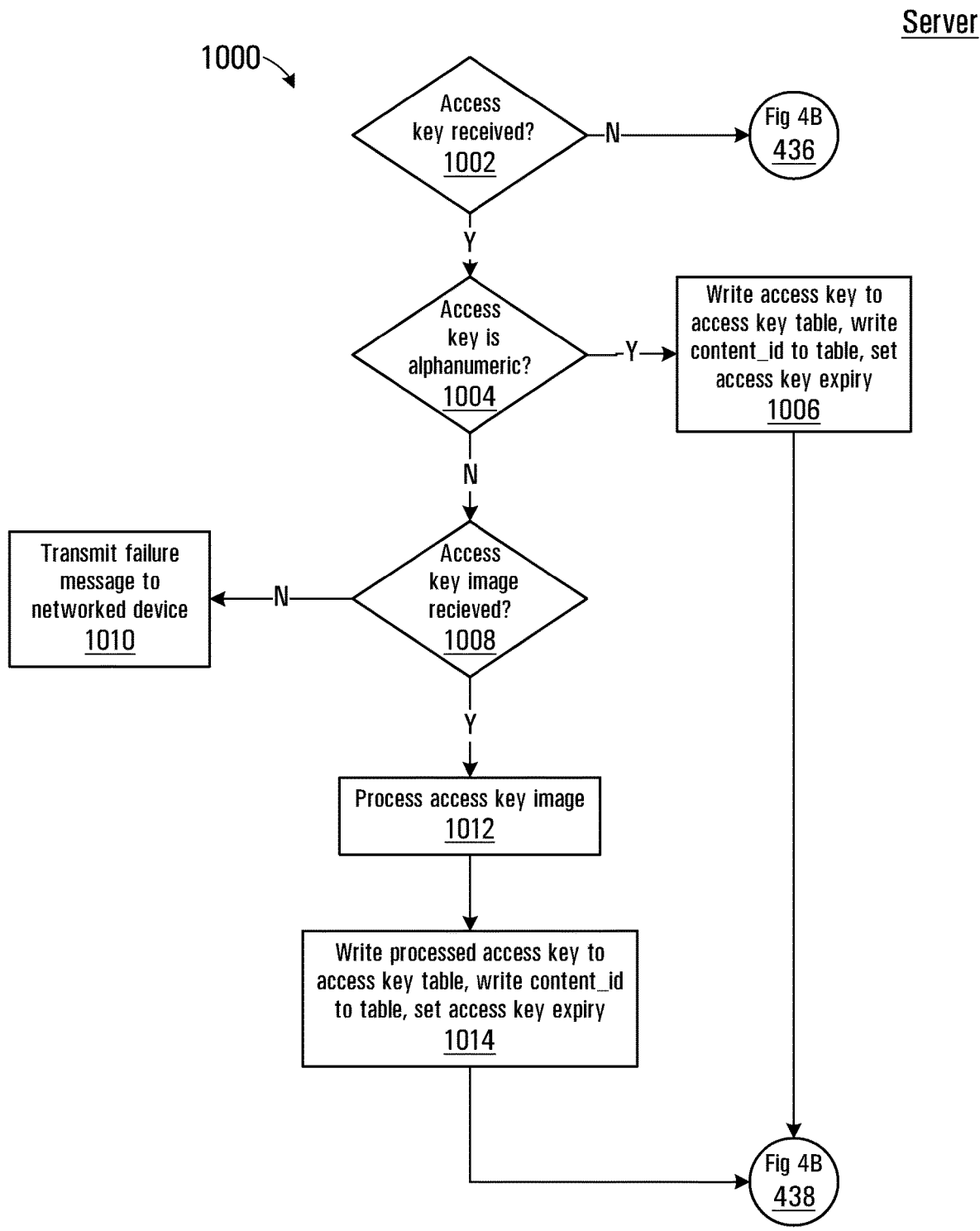
FIG. 10 is a process flowchart depicting blocks of code for directing the server processor circuit in FIG. 2 to assign an access key for uploaded content data.

While the above embodiments have been described with reference to an alphanumeric access key selected by the server 102 other types of access key may also be handled by the server. For example, while block 436 of the server upload process 420 causes the server 102 to assign an alphanumeric access key, this block may be replaced by a process that permits other options for selection of the access key by the user uploading content data. Referring to FIG. 10, a process implemented on the server for assigning an access key is shown generally at 1000. The process 1000 may replace block 436 in the server upload process 420 and begins at block 1002. Block 1002 directs the microprocessor 200 to determine whether a text access key has been received from the first networked device 114. If no access key has been received at block 1002 as part of the content data upload, the microprocessor 200 is directed back to block 436 of the server upload process 420 and an access key is selected from the database as described above.

In this embodiment the user 116 of the first networked device 114 may submit an access key when the content data upload is initiated at block 408 of the device upload process 400 in FIG. 4A. If an access key has been received at block 1002, the microprocessor 200 is directed to block 1004, which directs the microprocessor to determine whether the access key consists of alphanumeric characters. If the access key is alphanumeric, block 1004 directs the microprocessor 200 to block 1006. Block 1006 directs the microprocessor 200 to write the access key to a new record in the access key table 630 with the access_key field set to the received alphanumeric access key and the content_id set to the value generated at block 434 of the server upload process 420. Block 1006 also directs the microprocessor 200 to set the access key expiry, as described above in connection with block 436. The microprocessor 200 is then directed to block 438 of the server upload process 420, and the process continues as described above.

In one embodiment, the ability to select an alphanumeric access key rather than have one assigned by the server 102 may be linked to the level of membership of the user. For example, only paid members may be offered this option or a minimum number of characters in the keyword may be restricted for unpaid members. Paid members may be permitted to use short keywords, while unpaid members may be required to provide some pre-determined minimum number of characters. In another embodiment, the access key may be contained within a Quick Response Code (QR code), barcode, or other encoded pattern displayed on a product or in connection with a service. In this case the user 116 of the first networked device 114 when uploading data content would provide an alphanumeric character string that corresponds to the alphanumeric characters encoded within the pattern when uploading data. The user 120 of the second networked device 118, when requesting the data content would then use the camera 340 to capture the encoded pattern and cause the microprocessor 302 of the processor circuit 300 to extract the alphanumeric character string that would form the basis of the content access request.

If at block 1004, the access key is not alphanumeric, the microprocessor 200 is directed to block 1008. Block 1008 directs the microprocessor 200 to determine whether an access key image has been received. If no access key image has been received, the user 116 of the second networked device 118 has failed to upload a valid access key and the process 100 continues at block 1010 where the microprocessor 200 is directed to transmit a failure message to the first networked device. If at block 1008, an access key image has been received, the microprocessor 200 is directed to block 1012. Block 1012 directs the microprocessor 200 to process the access key image. In some embodiments, the image file may be processed using a hash function to map the larger image data file to a smaller size hash value, which is stored in the access key field 642. The hash function would be configured to generate hash values that have relatively low possibility of two different images yielding the same hash value. In some embodiments the access key image file may be an image uploaded by the user 116 of the first networked device 114 for use as the access key, or may be a portion of an image extracted from the content data by the server 102. For example if the content is a set of presentation slide images, the server may extract one or more portions of the slides and use these as the access key.

Once the access key image has been processed at block 1012, the microprocessor 200 is directed to block 1014. Block 1014 directs the microprocessor 200 to write the processed access key image to the access_key field of a new record in the access key table 630 along with the content_id generated at block 434 of the server upload process 420. Block 1006 also directs the microprocessor 200 to set the access key expiry, as described above in connection with block 436. Block 1014 then directs the microprocessor 200 back to block 438 of the server upload process 420 and the remaining blocks of this process are completed as described above.

Request Access Key Handling

Figure 11:
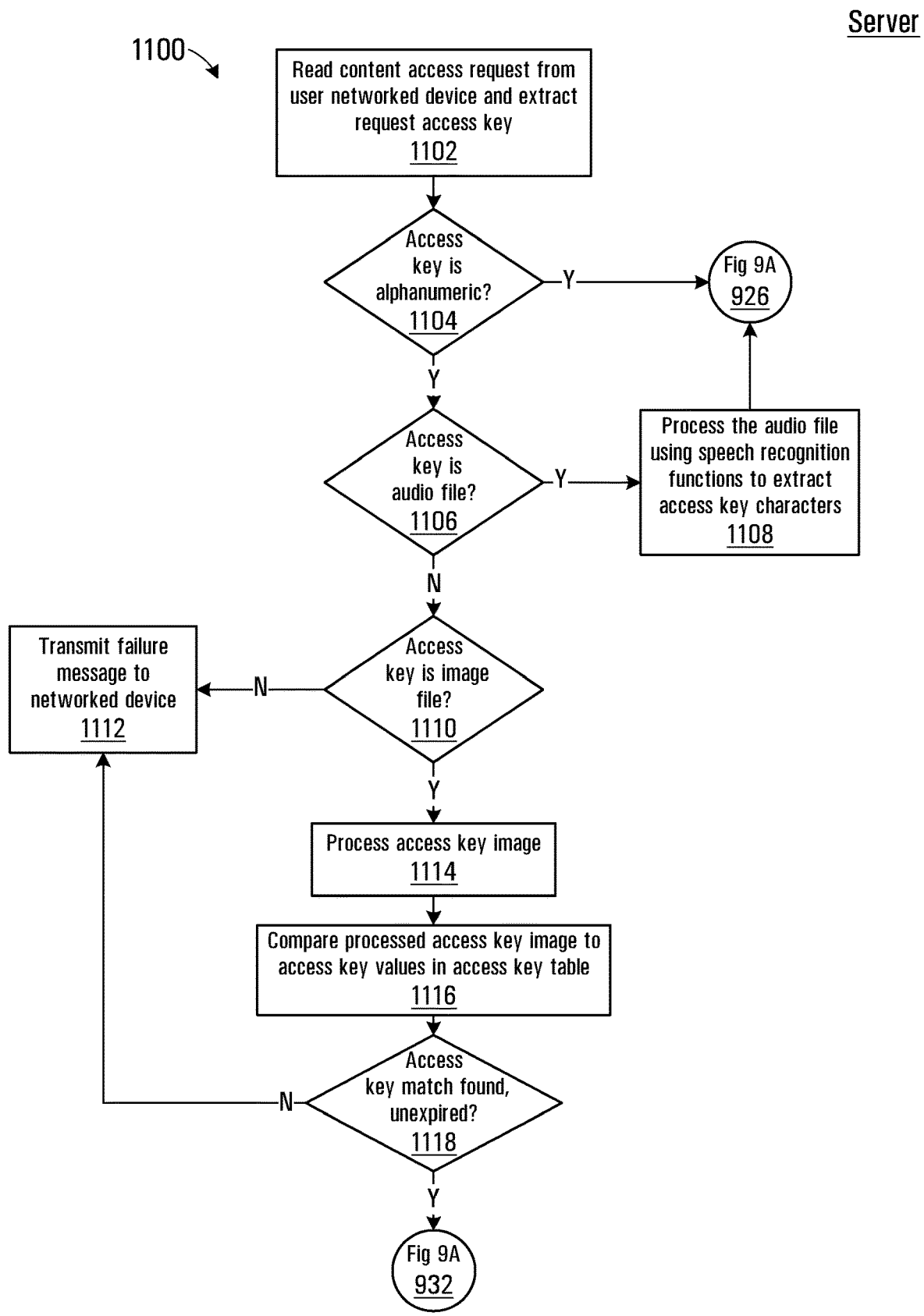
FIG. 11 is a process flowchart depicting blocks of code for directing the server processor circuit in FIG. 2 to process a request access key received in a content access request from a networked device.

At block 924 of the access request handling process 920 the server 102 is directed to process the access request to extract the access key. For a simple alphanumeric access key, this would involve opening up the content access request and reading the characters from an access key string. Referring to FIG. 11, a process for implementing block 924 of the process 920 to accommodate additional content access request options is shown at 1100. The process begins at block 1102, which directs the microprocessor 200 to read the content access request received at block 922 of the process 920 to extract the access key. In this embodiment the access key may be an alphanumeric character string, an image file captured by the camera 340 of the second networked device 118, or an audio file representing words spoken by the user 120 of the second networked device captured by the microphone 334 and encoded within an audio file by the audio processor 332.

Block 1104 then directs the microprocessor 200 to determine whether the request access key is alphanumeric, in which case the microprocessor is directed back to block 926 of the process 920. If the request access key is not alphanumeric, block 1104 directs the microprocessor 200 to block 1106. Block 1106 directs the microprocessor 200 to determine whether the request access key is an audio file, in which case the microprocessor is directed to block 1108. Block 1108 directs the microprocessor 200 to invoke the block of codes 224 for directing the microprocessor to provide speech recognition functions and to attempt to extract text associated with the spoken words in the audio file. Block 1108 then directs the microprocessor 200 back to block 926 of the process 920, where the extracted characters are processed as described above for an alphanumeric access key.

If at block 1106, the request access key is not an audio file, the microprocessor 200 is directed to block 1110. Block 1110 directs the microprocessor 200 to determine whether the request access key is an image file. If the request access key is not an image file, then the user 120 has submitted an invalid request access key and the microprocessor 200 is directed to block 1112, where a failure message is transmitted to the networked device. If at block 1110, the request access key is an image file, the microprocessor 200 is directed to block 1114, which directs the microprocessor to process the access key image. The processing of the access key image may be similar to the processing described above in connection with block 1012 of the process 1000, including in some embodiments parsing the access key image to a hash function to extract a hash value. The process 1100 then continues at block 1116, which directs the microprocessor 200 to compare the processed access key to the access key values in the access key table 630 in the networked database 112. Block 1118 then directs the microprocessor 200 to determine whether an access key match is found between the processed request access key and one of the access key values in the access key table 630. If a match is found, block 1118 also directs the microprocessor to determine whether the access key is remains unexpired and associated with content data. Block 1118 then directs the microprocessor 200 back to block 932 of the process 920 and processing continues as described above. If at block 1118 no access key match is found, the microprocessor 200 is directed to block 1112, where a failure message is transmitted to the second networked device 118.

The above disclosed embodiments enable sharing of content data, disclosed examples of which include jpeg image files and Portable Document Format (PDF) document files. Generally the disclosed processes will work with almost any other type of content, including other image file types such as Graphics Interchange Format (GIF), Tagged Image File Format (TIFF), bitmaps, etc. The content data may be contained in any of a plurality of different video file formats such as Audio Video Interleaved (AVI) format, MPEG video formats, Windows Media Video (WMV), or other video file formats. Most networked devices have the ability to open and display content in a variety of document, image, and video formats. The content data may alternatively have been generated within a software application such as a word processor, spreadsheet program, a presentation program such as Microsoft PowerPoint, a Computer-aided design (CAD) program, or any other program that produces content data in either a proprietary or open format. In this case the recipient networked device would need to have installed the application program or a viewer to be able to view the content.

The embodiments for sharing content data disclosed above may be used in a variety of different applications. A file sharing application has been described in some detail above and facilitates rapid and convenient sharing of content data files between individual users. Many other file sharing applications or platforms require that an email or text message be sent from the user making the content available to the recipient user. The email or text message generally includes a full address that identifies the exact location of the content on the network. The address is typically a long alphanumeric string, mostly in the form of a clickable reference link activated by clicking or tapping on the link. The above disclosed embodiments eliminate the need to exchange the full address of the content in favor of a very much shorter alphanumeric access keyword, which may be a meaningful word that can be easily remembered. Alternatively, the access key may be included within an image that facilitates easy extraction and association with the content data. The above disclosed embodiments also eliminate the need for the uploading user and recipient user to have each other's contact details in order for the content data sharing to be effected. Typically when individuals wish to share content on an ad-hoc basis without posting the content on a website or other media platform, contact details of the recipient user such as an email address or telephone number are required in order to send the content address or link to the recipient. The above disclosed embodiments permit a user to share publically available content data without even knowing the recipient user.

Figure 12:
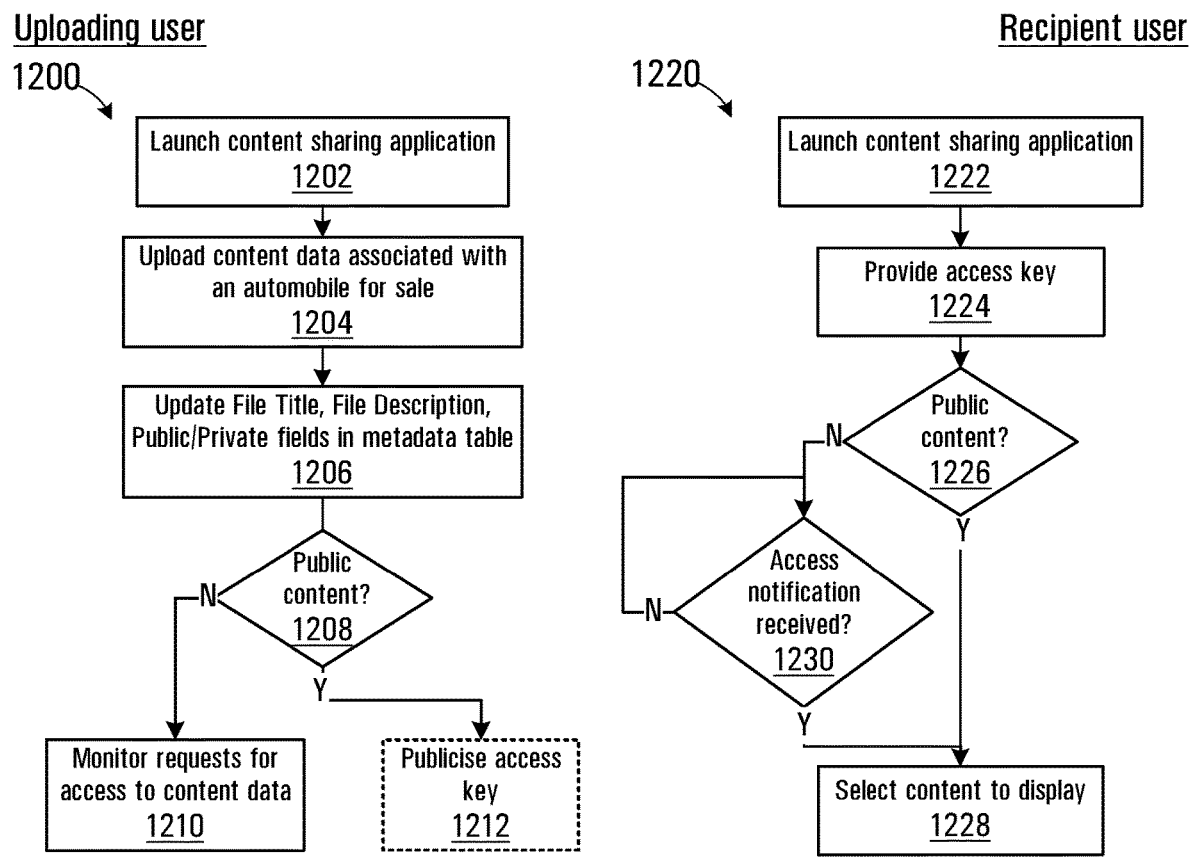
FIG. 12 is a flowchart for an automobile vending process.

The above disclosed embodiments also have application in the automobile trade. A flowchart for an automobile vending process implemented using the various processes disclosed above is shown generally in FIG. 12. Referring to FIG. 12, steps performed by the automobile vendor are shown at 1200. The process begins when the uploading user (i.e. the automobile vendor) launches the content sharing application by executing the device upload process 400 shown in FIG. 4A. The process then continues as shown at 1204, where the automobile vendor uploads content associated with the automobile that is for sale by executing a remaining portion of the device upload process 400 shown in FIG. 4B. The automobile vendor may upload content such as images, brochures, specifications, road report, or any of a variety of different types of content associated with the automobile for sale that would be of interest to a purchaser. At 1206, the automobile vendor may update the metadata associated with the uploaded content and also designate the content as either private or public. As shown at 1208, the processing differs depending on whether the content is public or not. If the content is designated to be public which is the most likely option, the automobile vendor may optionally take additional steps to publicize the content by making the access key available. For example, the automobile vendor may provide notice to the public that content data for automobiles on a vendor lot are accessible via the vehicle registration plate number. In some cases where the automobile vendor wishes to make the content private, the automobile vendor would continue to monitor requests for access as shown at 1210.

Steps performed by a potential purchaser are shown at 1220. The process begins when the recipient user (i.e. the potential purchaser) launches the content sharing application. As shown at 1224, the user then provides an access key generally as described above in connection with the process 900 in FIG. 9A. In some cases the access key may be entered by capturing an image of the vehicle registration plate or other identifying information such as the VIN plate. In other cases the access key may be manually entered as a plate number or other keyword as advertised by the automobile vendor. If the content is public, as shown at 1226, then the content will be made directly available as shown at 1228 by adding the content to the user's dashboard as described in connection with block 908 in FIG. 9A. If the content is private, the user would need to monitor the dashboard as shown at 1230 to determine whether an access notification has been received (described in connection with the process 950 in FIG. 9C). Once access is granted, the user may access the content as shown at 1228.

The automobile vendor application may be used by new or used automobile vendors to share content applicable to a specific automobile with potential purchasers. Usage is not limited to vehicles on an automobile vendors lot, but could also extend to automobiles in active use on the roads. Additionally, whenever access to content data for an automobile is requested, a notification including the requesting user's contact information may be sent to the automobile vendor. The application is thus capable of establishing a communication channel between automobile vendor and potential purchasers.

Figure 13:
FIG. 13 is an example of an advertisement used in an advertising campaign.

In another commercial application, a vendor of any product or service may make use of the above disclosed embodiments to share advertising content with interested users. Referring to FIG. 13, an example of an advertisement that may be carried in a magazine, billboard, newspaper or any other advertising medium is shown at 1300. The advertisement 1300 may be displayed in print form or electronic form depending on the nature of the advertising campaign. The advertisement 1300 includes an access keyword "Milk" 1302 in conjunction with the "LinkMe" label 1304. In other embodiments the label 1304 may be replaced by a recognizable logo that designates the access keyword 1302 as being associated with the content sharing application described herein. The vendor placing the advertisement will have previously uploaded content data as described in the device upload process 400 in FIG. 4. The content data may provide additional information about the product, for example Nutritional information, product information, etc. An interested recipient user would launch the content sharing application and either manually enter the access keyword "Milk" or capture and submit an image of a portion of the advertisement 1300 including the access keyword 1302 to access the content generally as described in connection with the process 1220 in FIG. 12.

As an alternative to the access keyword 1302 and label 1304, the advertisement 1300 also includes a telephone number 1306. Since telephone numbers are unique to the subscriber, the telephone number 1306 provides a convenient access key for accessing content data. As described above, the recipient user may enter the telephone number 1306 manually or capture and submit an image of this portion of the advertisement 1300. In other embodiments the access key may be a registered business name that has been registered with the content sharing application provider as a permanent or subscribed access key.

In another embodiment, vendors of professional and other services may upload content data such as a professional profile, resume, or information about offered services. The content data may be associated with a company name, telephone number or other designated access key on the professional's business card. Subsequently a recipient of the professional's business card may conveniently access more information about the services offered. Similarly, a professional making a presentation at a conference or networking event may upload materials or a copy of the presentation for access via an access key such as an image of a portion of the presentation file displayed during the presentation, a keyword displayed during the presentation, or an access keyword included in materials related to the presentation. The recipient user is thus provided with convenient access to the uploaded materials without contacting the presenter.

While specific embodiments have been described and illustrated, such embodiments should be considered illustrative only and not as limiting the disclosed embodiments as construed in accordance with the accompanying claims.

What is claimed is:

1. A server implemented method for sharing content data between networked devices in communication with a server processor circuit via a data network, the method comprising:
   in response to a request received at the server from a first networked device to upload content data, causing the content data to be written to a storage location at a content storage address;
   causing the server processor circuit to:
      store the content storage address in a database managed by the server;
      associate an access key with the content storage address in the database;
      determine and store an expiry for the access key in the database, the expiry facilitating a determination as to whether the access key remains actively associated with the content data or has expired and is no longer associated with the content data;
         wherein the database includes a plurality of stored keywords, each keyword being a unique and meaningful alphanumeric word or phrase and wherein associating the access key with the content data comprises selecting a keyword in the database that either has not yet been associated with content data or has expired and is no longer associated with the content data;

receiving a content access request at the server from a second networked device to access the content data uploaded by the first networked device, the content access request including a request access key; and causing the server processor circuit to perform a database query and if there is an unexpired access key in the database that matches the request access key, authorizing the second networked device to access the content data.

2. The method of claim 1 wherein causing the server processor circuit to determine the expiry for the access key comprises setting an expiry for the access key at about 90 days from a date of association of the access key.

3. The method of claim 2 further comprising, in response to receiving a request from a user of the first networked device, causing the server processor circuit to extend the expiry of the access key by an additional time period.

4. The method of claim 1 wherein the access key comprises an alphanumeric keyword, the keyword having a length of less than 20 characters.

5. The method of claim 1 wherein the request to upload content data includes a user identification of a user of the first networked device, and further comprising performing a user authentication prior to uploading the content data to the storage location.

6. The method of claim 5 further comprising storing and associating the user identification of the user of first networked device with the content storage address of the content data in the database.

7. The method of claim 1 wherein causing the content data to be written to the storage location comprises receiving the content data from the first network device at the server, and wherein causing the content data to be written to the storage location comprises writing the content data to a network storage location accessible via the data network and having a network storage address.

8. The method of claim 7 further comprising processing the received content data prior to writing to the network storage location, wherein the processing comprises at least one of:
determining a data size associated with the content;
establishing compliance with criteria for storage of the content data in the network storage location;
performing a virus scan on the content data;
performing a malware scan on the content data; or
encrypting the content data.

9. The method of claim 1 wherein associating the access key with the content data comprises receiving access key data from the first networked device and storing the access key data in the database.

10. The method of claim 9 further comprising causing the server processor circuit to extend the expiry beyond an access key lifetime for an access key based on access key data received from a networked device.

11. The method of claim 1 wherein determining expiry for the access key comprises one of:
calculating an expiry time based on an access key lifetime and storing the expiry time in the database;
storing in the database, a time of day when the access key was associated with the content data in the database, and calculating an expiry time based on a pre-determined access key lifetime;
calculating an expiry time based on an access key lifetime, the access key lifetime selected from a plurality of pre-determined access key lifetimes associated with different levels of user membership, and storing the expiry time in the database; or
calculating an expiry time based on a number of characters in an access keyword comprising a plurality of alphanumeric characters.

12. The method of claim 1 wherein associating the access key with the content data comprises associating an image with the content data, the image comprising one of:
image data extracted by the server from the content data;
image data uploaded by the first networked device for associating with the content data;
a barcode, QR code, or other encoded pattern assigned by the server; or
a barcode, QR code or other encoded pattern uploaded by the first networked device for associating with the content data.

13. The method of claim 12 further comprising causing the server processor circuit to generate a content identifier and to store and associate the content identifier in the database with at least one of the content storage address and the associated access key.

14. The method of claim 13 wherein causing the server processor circuit to store the content storage address comprises storing a content record to a content table in the database, the content record including the content storage address and the content identifier and wherein associating the access key with the content storage address comprises storing the content identifier in an access key record in an access key table in the database, the access key record further including the access key and the expiry associated with the access key.

15. The method of claim 13 further comprising causing the server processor circuit to generate and associate a status with the content data, the status being indicative that the content data is owned by a user of the first networked device.

16. The method of claim 15 further comprising, in response to a request from the first networked device, querying the database to extract information associated with all content data uploaded by the user of the first networked device and transmitting the information for display on the first networked device.

17. The method of claim 16 further comprising in response to a requested change to the information associated with the content data received from the user of the first networked device, causing the server processor circuit to make the requested change to the information associated with the content data in the database.

18. The method of claim 12 further comprising:
receiving from the first networked device, a privacy indicator indicating that the content data should be only accessible on a private basis by users that have been granted permission by a user of the first networked device; and
storing and associating the privacy indicator with the content storage address for the content data.

19. The method of claim 12 further comprising generating additional metadata for the content data and storing and associating the metadata with the content storage address for the content data, wherein the additional metadata includes at least one of:
a user name associated with a user of the first device;
a data size of the networked content;
a content data title associated with the content data; or a content data description associated with the content data.

20. The method of claim 12 wherein the access request further includes an identification of a user of the second networked device, and further comprising performing a user authentication prior to causing the server processor circuit to perform the database query to determine if there is an unexpired access key in the database that matches the request access key.

21. The method of claim 12 wherein the request access key in the access request comprises one of:
   a unique and meaningful alphanumeric keyword or phrase entered by the user of the second networked device;
   alphanumeric text extracted from an image having the keyword digitally encoded therein, the image being captured and processed by the second networked device to extract the alphanumeric text;
   alphanumeric text extracted by performing speech recognition on audio data, the audio data being captured and processed by the second networked device to extract the alphanumeric text.

22. The method of claim 12 wherein receiving the access request comprises receiving an access key comprising an image related to the content data, and further comprising causing the server to process the image to extract an identifying feature and wherein causing the server processor circuit to query the database comprises causing the server to determine whether an access key stored in the database has a matching identifying feature.

23. The method of claim 22 wherein the identifying feature comprises one of:
   a keyword extracted from the image by causing the server processor circuit to perform optical character recognition on the image; or
   a pattern extracted from the image by causing the server processor circuit to perform a rendering process on the image.

24. The method of claim 12 wherein authorizing the second networked device to access the content data comprises:
   causing the server processor circuit to query the database to determine whether the content data has a privacy indicator indicating that the content data should be only accessible on a private basis by users that have been granted permission by a user of the first networked device; and
   if the privacy indicator indicates that the content data is not only accessible on a private basis, causing the server processor circuit to store a status indicator in the database indicating that the content data is shared with the user of the second networked device.

25. The method of claim 12 wherein authorizing the second networked device to access the content data comprises:
   causing the server processor circuit to query the database to determine whether the content data has privacy indicator indicating that the content data should be only accessible on a private basis by users that have been granted permission by a user of the first networked device;
   if the privacy indicator indicates that the content data is only accessible on a private basis, causing the server to generate a notification for transmission to the user of the first networked device indicating that a user of the second networked device has requested access to the content data; and
   in response to receiving sharing permission from the user of the first networked device to share the content data, causing the server processor circuit to store and associate a status indicator in the database with the content storage address of the content data, the status indicator being indicative that the content data is shared with the user of the second networked device.

26. The method of claim 25 further comprising in response to a request from the second networked device, querying the database to extract information associated with all content data shared with the user of the second networked device and transmitting the information for display on the second networked device and further comprising in response to receiving a selection from the second networked device of an item of content data shared with the user, causing the processor to download the content data from the storage location and to transmit the content data to the second networked device.

27. The method of claim 12 wherein the content data comprises a presentation file and wherein the access key comprises one of:
   an image of a portion of the presentation file displayed during a live presentation;
   a keyword displayed during a live presentation; or
   a keyword included in materials related to the presentation.

28. The method of claim 12 wherein the content data comprises information associated with an item that is available for purchase and wherein the access key comprises one of:
   a vehicle identification number for a vehicle;
   a captured image of a plate bearing the vehicle identification number;
   alphanumeric characters of a vehicle registration plate on a vehicle;
   a captured image of the vehicle registration plate; or
   a listing number of a property for sale.

29. A server apparatus for sharing content data between networked devices in communication with the server via a data network, the apparatus comprising:
   a server processor circuit;
   a storage location accessible by the server processor circuit;
   a database managed by the server;
   wherein the server processor circuit is operably configured to:
      in response to a request received at the server from a first networked device to upload content data, cause the content data to be written to the storage location at a content storage address;
      store the content storage address in the database;
      associate an access key with the content storage address in the database;
      determine and store an expiry for the access key in the database, the expiry facilitating a determination as to whether the access key remains actively associated with the content data or has expired and is no longer associated with the content data;
      wherein the database includes a plurality of stored keywords, each keyword being a unique and meaningful alphanumeric word or phrase and
      wherein associating the access key with the content data comprises selecting a keyword in the database that either has not yet been associated with content data or has expired and is no longer associated with the content data;

receive an access request at the server from a second networked device to access the content data uploaded by the first networked device, the access request including a request access key; and perform a database query and if there is an unexpired access key in the database that matches the request access key, authorize the second networked device to access the content data.

\* \* \* \* \*